United States Patent
Li

(10) Patent No.: US 12,088,445 B2
(45) Date of Patent: Sep. 10, 2024

(54) METHODS AND APPARATUSES FOR FREQUENCY-OFFSET DETERMINATION AND RESOURCE BLOCK TRANSMISSION

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 480 days.

(21) Appl. No.: 17/594,460

(22) PCT Filed: Apr. 18, 2019

(86) PCT No.: PCT/CN2019/083299
§ 371 (c)(1),
(2) Date: Oct. 18, 2021

(87) PCT Pub. No.: WO2020/211054
PCT Pub. Date: Oct. 22, 2020

(65) Prior Publication Data
US 2022/0210000 A1 Jun. 30, 2022

(51) Int. Cl.
*H04L 27/26* (2006.01)
*H04L 27/00* (2006.01)
*H04W 4/40* (2018.01)

(52) U.S. Cl.
CPC ...... *H04L 27/2613* (2013.01); *H04L 27/0014* (2013.01); *H04L 27/2605* (2013.01); *H04W 4/40* (2018.02); *H04L 2027/0026* (2013.01)

(58) Field of Classification Search
CPC ............. H04L 27/2613; H04L 27/0014; H04L 27/2605; H04L 2027/0026; H04W 4/40
See application file for complete search history.

(56) References Cited

U.S. PATENT DOCUMENTS

| | | |
|---|---|---|
| 2017/0331664 A1 | 11/2017 | Cheon et al. |
| 2018/0176058 A1* | 6/2018 | Kim .................... H04L 27/2675 |
| 2018/0241508 A1* | 8/2018 | Chervyakov .......... H04W 4/40 |
| 2018/0359067 A1 | 12/2018 | Kim et al. |

FOREIGN PATENT DOCUMENTS

| | | |
|---|---|---|
| CN | 102546500 A | 7/2012 |
| CN | 103139132 A | 6/2013 |
| CN | 106656441 A | 5/2017 |
| CN | 106656453 A | 5/2017 |

(Continued)

OTHER PUBLICATIONS

Intellectual property India, Office Action Issued in Application No. 202147052802, Mar. 25, 2022, 7 pages.

(Continued)

*Primary Examiner* — Basil Ma
(74) *Attorney, Agent, or Firm* — Syncoda LLC; Feng Ma

(57) ABSTRACT

A method of frequency-offset determination includes: receiving a resource block containing one or more auxiliary frequency-offset estimation signals and pilot signals from a second device; and calculating the one or more auxiliary frequency-offset estimation signals and the pilot signals to determine a frequency offset for demodulating the resource block. At least one of the first device or the second device is a vehicle.

20 Claims, 18 Drawing Sheets

Receive a resource block containing one or more auxiliary frequency-offset estimation signals and pilot signals from a second device — S1

Calculate the one or more auxiliary frequency-offset estimation signals and the pilot signals to determine a frequency offset for demodulating the resource block, where at least one of the first device or the second device is a vehicle — S2

(56) References Cited

FOREIGN PATENT DOCUMENTS

| | | | |
|---|---|---|---|
| CN | 107026720 | A | 8/2017 |
| CN | 107317779 | A | 11/2017 |
| CN | 107800525 | A | 3/2018 |
| CN | 108566266 | A | 9/2018 |
| WO | 2018144337 | A1 | 8/2018 |

OTHER PUBLICATIONS

European Patent Office, Extended European Search Report Issued in Application No. 19925024.2, Mar. 11, 2022, Germany, 10 pages.
ISA State Intellectual Property Office of the People's Republic of China, Written Opinion of the International Searching Authority Issued in Application No. PCT/CN2019/083299, Jan. 2, 2020, WIPO, 9 pages.
State Intellectual Property Office of the People's Republic of China, Office Action and Search Report Issued in Application No. CN 2019800006672, Jun. 3, 2021, 21 pages.
ISA State Intellectual Property Office of the People's Republic of China, International Search Report Issued in Application No. PCT/CN2019/083299, Jan. 2, 2020, WIPO, 4 pages.
NTT Docomo, Inc., Workplan for Study on NR Access Technology, 3GPP TSG RAN1 NR Ad-Hoc Spokane, USA, Jan. 16-20, 2017, R1-1700589.
European Patent Office Action Issued in Application No. 19925024.2, Feb. 28, 2023, Netherlands, 6 pages.

\* cited by examiner

Apparatus for Frequency-offset Determination

- Resource Block Receiving Module — 1
- Frequency-offset Calculating Module — 2
  - First Calculating Submodule — 21
  - Second Calculating Submodule — 22

FIG. 28

Apparatus for Frequency-offset Determination

- Resource Block Receiving Module — 1
- Frequency-offset Calculating Module — 2
  - First Calculating Submodule — 21
  - Second Calculating Submodule — 22
- First Determining Module — 3A
- Second Determining Module — 3B

FIG. 29

Apparatus for Resource Block Transmission

- Resource Block Configured Module — 1'
- Resource Block Transmitting Module — 2'

FIG. 36

Apparatus for Resource Block Transmission

- Resource Block Configured Module — 1'
- Resource Block Transmitting Module — 2'
- First Signaling Transmitting Module — 3'

FIG. 37

Apparatus for Resource Block Transmission

- Resource Block Configured Module — 1'
- Resource Block Transmitting Module — 2'
- Second Signaling Transmitting Module — 4'

FIG. 38

METHODS AND APPARATUSES FOR FREQUENCY-OFFSET DETERMINATION AND RESOURCE BLOCK TRANSMISSION

CROSS-REFERENCE TO RELATED APPLICATION

This application is the national stage of International Application No. PCT/CN2019/083299 filed on Apr. 18, 2019, the disclosure of which is hereby incorporated by reference in its entirety.

TECHNICAL FIELD

The present disclosure relates to the field of communication technology, and in particular, relates to methods of frequency-offset determination, methods of resource block transmission, apparatuses for frequency-offset determination, apparatuses for resource block transmission, electronic devices and computer-readable storage media.

BACKGROUND

In Vehicle-to-Everything (V2X) technologies, such as in a Vehicle-to-Vehicle (V2V) scenario, two vehicles may meet oppositely side-by-side. In this case, a relative velocity between these two vehicles can reach twice as much as a driving speed of one of the two, which causes a greater frequency offset (also called Doppler frequency shift) as a signal is received by one vehicle from another, thereby affecting demodulation of the received signal.

In order to demodulate the received signal successfully, the frequency offset is estimated mainly based on pilot signals in a resource block received by a terminal in the related art. For example, in Long Term Evolution (LTE) V2X, the pilot signals in the resource block received by the terminal are distributed as illustrated in FIG. 1, and coherence time may be regarded as interval time between two pilot signals in the time domain, i.e., 3 symbols. Taking an example of $1/14$ milliseconds as a length of one symbol, the frequency offset which can be estimated based on the positions of the pilot signals in the resource block in LTE V2X is about $0.43/(3/14$ milliseconds$)=2$ kHz.

However, since a higher carrier frequency (which may be up to 30 GHz or even higher than 60 GHz) is expected to be adopted in New Radio (NR) V2X, a communication on such a high-frequency carrier may cause a greater frequency offset.

SUMMARY

In view of the above, examples of the present disclosure provide methods of frequency-offset determination, methods of resource block transmission, apparatuses for frequency-offset determination, apparatuses for resource block transmission, electronic devices and computer-readable storage media, so as to solve the technical problem that the greater frequency offset may be caused by a communication on a high-frequency carrier.

According to a first aspect of the examples of the present disclosure, there is provided a method of frequency-offset determination, being applicable to a first device in an NR V2X network, and the method includes:
receiving a resource block containing one or more auxiliary frequency-offset estimation signals and pilot signals from a second device; and
calculating the one or more auxiliary frequency-offset estimation signals and the pilot signals to determine a frequency offset for demodulating the resource block, where at least one of the first device or the second device is a vehicle.

Alternatively or additionally, the one or more auxiliary frequency-offset estimation signals and the pilot signals occupy an entire frequency domain on at least one time-domain unit; where said calculating the one or more auxiliary frequency-offset estimation signals and the pilot signals to determine the frequency offset for demodulating the resource block includes:
calculating, via a single-symbol estimation scheme, the one or more auxiliary frequency-offset estimation signals and the pilot signals that occupy the entire frequency domain on the at least one time-domain unit to determine the frequency offset.

Alternatively or additionally, the one or more auxiliary frequency-offset estimation signals include one or more first auxiliary frequency-offset estimation signals and one or more second auxiliary frequency-offset estimation signals, where the one or more first auxiliary frequency-offset estimation signals and the pilot signals are adjacent in a time domain, where the one or more second auxiliary frequency-offset estimation signals and the pilot signals occupy an entire frequency domain on at least one time-domain unit, and where said calculating the one or more auxiliary frequency-offset estimation signals and the pilot signals to determine the frequency offset for demodulating the resource block includes:
calculating, via a single-symbol estimation scheme, the one or more second auxiliary frequency-offset estimation signals and the pilot signals that occupy the entire frequency domain on the at least one time-domain unit to determine a first sub frequency offset; and
calculating, via a multi-column-pilot-combined phase calculation scheme, the one or more first auxiliary frequency-offset estimation signals and the pilot signals that are adjacent in the time domain to determine a second sub frequency offset, where the first sub frequency offset is greater than the second sub frequency offset.

Alternatively or additionally, the method further includes:
determining, based on the first sub frequency offset, a first frequency for demodulating the resource block; and
determining, based on the second sub frequency offset, a second frequency for demodulating the resource block on a basis of the first frequency.

Alternatively or additionally, the one or more auxiliary frequency-offset estimation signals and the pilot signals are adjacent in a time domain; where said calculating the one or more auxiliary frequency-offset estimation signals and the pilot signals to determine the frequency offset for demodulating the resource block includes:
calculating, via a multi-column-pilot-combined phase calculation scheme, the one or more auxiliary frequency-offset estimation signals and the pilot signals that are adjacent in the time domain to determine a third sub frequency offset.

Alternatively or additionally, the pilot signals occupy an entire frequency domain on at least one time-domain unit; where said calculating the one or more auxiliary frequency-offset estimation signals and the pilot signals to determine the frequency offset for demodulating the resource block further includes:
calculating, via a single-symbol estimation scheme, the pilot signals that occupy the entire frequency domain on any one time-domain unit to determine a fourth sub frequency offset for demodulating the resource block, where the fourth sub frequency offset is greater than the third sub frequency offset.

Alternatively or additionally, the method further includes:
determining, based on the fourth sub frequency offset, a third frequency for demodulating the resource block; and
determining, based on the third sub frequency offset, a fourth frequency for demodulating the resource block on a basis of the third frequency.

Alternatively or additionally, the pilot signals do not occupy an entire frequency domain on any one time-domain unit; where said calculating the one or more auxiliary frequency-offset estimation signals and the pilot signals to determine the frequency offset for demodulating the resource block further includes:
calculating, via a multi-column-pilot-combined phase calculation scheme, two pilot signals that are on different time-domain units to determine a fifth sub frequency offset for demodulating the resource block, where the third sub frequency offset is greater than the fifth sub frequency offset.

Alternatively or additionally, the method further includes:
determining, based on the third sub frequency offset, a fifth frequency for demodulating the resource block; and
determining, based on the fifth sub frequency offset, a sixth frequency for demodulating the resource block on a basis of the fifth frequency.

Alternatively or additionally, in response to determining that the resource block contains a plurality of pairs of the auxiliary frequency-offset estimation signals and the pilot signals, said calculating the one or more auxiliary frequency-offset estimation signals and the pilot signals to determine the frequency offset for demodulating the resource block includes:
calculating the plurality of pairs of the auxiliary frequency-offset estimation signals and the pilot signals to determine a plurality of the frequency offsets; and
calculating an average value of the plurality of the frequency offsets or a weighted sum of the plurality of the frequency offsets.

Alternatively or additionally, the one or more auxiliary frequency-offset estimation signals and the pilot signals are identical in quantity in the resource block.

Alternatively or additionally, the method further includes:
receiving first indication signaling from the second device;
determining time-frequency resource positions of the pilot signals in the resource block according to the first indication signaling; and
determining, based on the time-frequency resource positions of the pilot signals in the resource block and a preset time-domain and/or frequency-domain relationship between the one or more auxiliary frequency-offset estimation signals and the pilot signals in the resource block, time-frequency resource positions of the one or more auxiliary frequency-offset estimation signals in the resource block.

Alternatively or additionally, the pilot signals are larger than the one or more auxiliary frequency-offset estimation signals in quantity in the resource block.

Alternatively or additionally, the method further includes:
receiving second indication signaling transmitted by the second device and third indication signaling broadcast by the second device; and determining time-frequency resource positions of the pilot signals in the resource block according to the second indication signaling and time-frequency resource positions of the one or more auxiliary frequency-offset estimation signals in the resource block according to the third indication signaling.

Alternatively or additionally, the resource block includes a control channel and a shared channel.

Alternatively or additionally, the method further includes:
adjusting, based on the frequency offset, at least one of a frequency for demodulating the control channel or a frequency for demodulating the shared channel.

Alternatively or additionally, said adjusting, based on the frequency offset, at least one of the frequency for demodulating the control channel or the frequency for demodulating the shared channel includes:
in response to determining that the one or more auxiliary frequency-offset estimation signals and the pilot signals are located within the control channel, adjusting, based on the frequency offset, the frequency for demodulating the control channel;
in response to determining that the one or more auxiliary frequency-offset estimation signals and the pilot signals are located within the shared channel, adjusting, based on the frequency offset, the frequency for demodulating the shared channel; and
in response to determining that for the one or more auxiliary frequency-offset estimation signals and the pilot signals, at least one of which is located within the control channel and at least one of which is located within the shared channel, adjusting, based on the frequency offset, the frequency for demodulating the control channel and the frequency for demodulating the shared channel.

According to a second aspect of the examples of the present disclosure, there is provided a method of resource block transmission, being applicable to a second device in an NR V2X network, and the method includes:
configuring, based on a frequency offset by which a first device demodulates a resource block transmitted by the second device, the resource block containing one or more auxiliary frequency-offset estimation signals and pilot signals; and
transmitting the resource block to the first device.

Alternatively or additionally, the one or more auxiliary frequency-offset estimation signals and the pilot signals occupy an entire frequency domain on at least one time-domain unit.

Alternatively or additionally, the one or more auxiliary frequency-offset estimation signals include one or more first auxiliary frequency-offset estimation signals and one or more second auxiliary frequency-offset estimation signals, where the one or more first auxiliary frequency-offset estimation signals and the pilot signals are adjacent in a time domain, and the one or more second auxiliary frequency-offset estimation signals and the pilot signals occupy an entire frequency domain on at least one time-domain unit.

Alternatively or additionally, the one or more auxiliary frequency-offset estimation signals and the pilot signals are adjacent in a time domain.

Alternatively or additionally, the pilot signals occupy an entire frequency domain on at least one time-domain unit.

Alternatively or additionally, the pilot signals do not occupy an entire frequency domain on any one time-domain unit.

Alternatively or additionally, the resource block contains a plurality of pairs of the auxiliary frequency-offset estimation signals and the pilot signals.

Alternatively or additionally, the one or more auxiliary frequency-offset estimation signals and the pilot signals are identical in quantity in the resource block.

Alternatively or additionally, the method further includes:
transmitting first indication signaling to the first device, where the first indication signaling indicates time-frequency resource positions of the pilot signals in the resource block.

Alternatively or additionally, the pilot signals are larger than the one or more auxiliary frequency-offset estimation signals in quantity in the resource block.

Alternatively or additionally, the method further includes:
transmitting second indication signaling to the first device and broadcasting third indication signaling, where the second indication signaling indicates time-frequency resource positions of the pilot signals in the resource block, and the third indication signaling indicates time-frequency resource positions of the one or more auxiliary frequency-offset estimation signals in the resource block.

Alternatively or additionally, the resource block includes a control channel and a shared channel.

Alternatively or additionally, the one or more auxiliary frequency-offset estimation signals and the pilot signals are located within the control channel; or
the one or more auxiliary frequency-offset estimation signals and the pilot signals are located within the shared channel; or
for the one or more auxiliary frequency-offset estimation signals and the pilot signals, at least one of which is located within the control channel and at least one of which is located within the shared channel.

According to a third aspect of the examples of the present disclosure, there is provided an apparatus for frequency-offset determination, being applicable to a first device in an NR V2X network, and the apparatus includes:
a resource block receiving module, configured to receive a resource block containing one or more auxiliary frequency-offset estimation signals and pilot signals from a second device; and
a frequency-offset calculating module, configured to calculate the one or more auxiliary frequency-offset estimation signals and the pilot signals to determine a frequency offset for demodulating the resource block, where at least one of the first device or the second device is a vehicle.

Alternatively or additionally, the one or more auxiliary frequency-offset estimation signals and the pilot signals occupy an entire frequency domain on at least one time-domain unit, where the frequency-offset calculating module is configured to calculate, via a single-symbol estimating device, the one or more auxiliary frequency-offset estimation signals and the pilot signals that occupy the entire frequency domain on the at least one time-domain unit to determine the frequency offset.

Alternatively or additionally, the one or more auxiliary frequency-offset estimation signals include one or more first auxiliary frequency-offset estimation signals and one or more second auxiliary frequency-offset estimation signals, where the one or more first auxiliary frequency-offset estimation signals and the pilot signals are adjacent in a time domain, where the one or more second auxiliary frequency-offset estimation signals and the pilot signals occupy an entire frequency domain on at least one time-domain unit, and where the frequency-offset calculating module includes:
a first calculating submodule, configured to calculate, via a single-symbol estimation device, the one or more second auxiliary frequency-offset estimation signals and the pilot signals that occupy the entire frequency domain on the at least one time-domain unit to determine a first sub frequency offset; and
a second calculating submodule, configured to calculate, via a multi-column-pilot-combined phase calculation device, the one or more first auxiliary frequency-offset estimation signals and the pilot signals that are adjacent in the time domain to determine a second sub frequency offset, where the first sub frequency offset is greater than the second sub frequency offset.

Alternatively or additionally, the apparatus further includes:
a first determining module, configured to determine, based on the first sub frequency offset, a first frequency for demodulating the resource block; and
a second determining module, configured to determine, based on the second sub frequency offset, a second frequency for demodulating the resource block on a basis of the first frequency.

Alternatively or additionally, the one or more auxiliary frequency-offset estimation signals and the pilot signals are adjacent in a time domain, where the frequency-offset calculating module is configured to calculate, via a multi-column-pilot-combined phase calculation device, the one or more auxiliary frequency-offset estimation signals and the pilot signals that are adjacent in the time domain to determine a third sub frequency offset.

Alternatively or additionally, the pilot signals occupy an entire frequency domain on at least one time-domain unit, where the frequency-offset calculating module is further configured to calculate, via a single-symbol estimation device, the pilot signals that occupy the entire frequency domain on any one time-domain unit to determine a fourth sub frequency offset for demodulating the resource block, where the fourth sub frequency offset is greater than the third sub frequency offset.

Alternatively or additionally, the apparatus further includes:
a third determining module, configured to determine, based on the fourth sub frequency offset, a third frequency for demodulating the resource block; and
a fourth determining module, configured to determine, based on the third sub frequency offset, a fourth frequency for demodulating the resource block on a basis of the third frequency.

Alternatively or additionally, the pilot signals do not occupy an entire frequency domain on any one time-domain unit, where the frequency-offset calculating module is further configured to calculate, via the multi-column-pilot-combined phase calculation device, two pilot signals that are on different time-domain units to determine a fifth sub frequency offset for demodulating the resource block, where the third sub frequency offset is greater than the fifth sub frequency offset.

Alternatively or additionally, the apparatus further includes:
a fifth determining module, configured to determine, based on the third sub frequency offset, a fifth frequency for demodulating the resource block; and a sixth determining module, configured to determine, based on the fifth sub frequency offset, a sixth frequency for demodulating the resource block on a basis of the fifth frequency.

Alternatively or additionally, in response to determining that the resource block contains a plurality of pairs of the auxiliary frequency-offset estimation signals and the pilot signals, the frequency-offset calculating module includes:
a frequency-offset calculating submodule, configured to calculate the plurality of pairs of the auxiliary frequency-offset estimation signals and the pilot signals to determine a plurality of the frequency offsets; and
a multi-item processing submodule, configured to calculate an average value of the plurality of the frequency offsets or a weighted sum of the plurality of the frequency offsets.

Alternatively or additionally, the one or more auxiliary frequency-offset estimation signals and the pilot signals are identical in quantity in the resource block.

Alternatively or additionally, the apparatus further includes:
a first signaling receiving module, configured to receive first indication signaling from the second device;
a pilot determining module, configured to determine time-frequency resource positions of the pilot signals in the resource block according to the first indication signaling; and
an auxiliary determining module, configured to determine, based on the time-frequency resource positions of the pilot signals in the resource block and a preset time-domain and/or frequency-domain relationship between the one or more auxiliary frequency-offset estimation signals and the pilot signals in the resource block, time-frequency resource positions of the one or more auxiliary frequency-offset estimation signals in the resource block.

Alternatively or additionally, the pilot signals are larger than the one or more auxiliary frequency-offset estimation signals in quantity in the resource block.

Alternatively or additionally, the apparatus further includes:
a second signaling receiving module, configured to receive second indication signaling transmitted by the second device and third indication signaling broadcast by the second device; and
a position determining module, configured to determine time-frequency resource positions of the pilot signals in the resource block according to the second indication signaling and time-frequency resource positions of the one or more auxiliary frequency-offset estimation signals in the resource block according to the third indication signaling.

Alternatively or additionally, the resource block includes a control channel and a shared channel.

Alternatively or additionally, the apparatus further includes:
a frequency adjusting module, configured to adjust, based on the frequency offset, at least one of a frequency for demodulating the control channel or a frequency for demodulating the shared channel.

Alternatively or additionally, the frequency adjusting module is configured to:
in response to determining that the one or more auxiliary frequency-offset estimation signals and the pilot signals are located within the control channel, adjust, based on the frequency offset, the frequency for demodulating the control channel;
in response to determining that the one or more auxiliary frequency-offset estimation signals and the pilot signals are located within the shared channel, adjust, based on the frequency offset, the frequency for demodulating the shared channel; and
in response to determining that for the one or more auxiliary frequency-offset estimation signals and the pilot signals, at least one of which is located within the control channel and at least one of which is located within the shared channel, adjust, based on the frequency offset, the frequency for demodulating the control channel and the frequency for demodulating the shared channel.

According to a fourth aspect of the examples of the present disclosure, there is provided an apparatus for resource block transmission, being applicable to a second device in an NR V2X network, and the apparatus includes:
a resource block configured module, configured to configure, based on a frequency offset by which a first device demodulates a resource block transmitted by the second device, the resource block containing one or more auxiliary frequency-offset estimation signals and pilot signals; and
a resource block transmitting module, configured to transmit the resource block to the first device.

Alternatively or additionally, the one or more auxiliary frequency-offset estimation signals and the pilot signals occupy an entire frequency domain on at least one time-domain unit.

Alternatively or additionally, the one or more auxiliary frequency-offset estimation signals include one or more first auxiliary frequency-offset estimation signals and one or more second auxiliary frequency-offset estimation signals, where the one or more first auxiliary frequency-offset estimation signals and the pilot signals are adjacent in a time domain, and the one or more second auxiliary frequency-offset estimation signals and the pilot signals occupy an entire frequency domain on at least one time-domain unit.

Alternatively or additionally, the one or more auxiliary frequency-offset estimation signals and the pilot signals are adjacent in a time domain.

Alternatively or additionally, the pilot signals occupy an entire frequency domain on at least one time-domain unit.

Alternatively or additionally, the pilot signals do not occupy an entire frequency domain on any one time-domain unit.

Alternatively or additionally, the resource block includes a plurality of pairs of the auxiliary frequency-offset estimation signals and the pilot signals.

Alternatively or additionally, the one or more auxiliary frequency-offset estimation signals and the pilot signals are identical in quantity in the resource block.

Alternatively or additionally, the apparatus further includes:
a first signaling transmitting module, configured to transmit first indication signaling to the first device, where the first indication signaling indicates time-frequency resource positions of the pilot signals in the resource block.

Alternatively or additionally, the pilot signals are larger than the one or more auxiliary frequency-offset estimation signals in quantity in the resource block.

Alternatively or additionally, the apparatus further includes:
a second signaling transmitting module, configured to transmit second indication signaling to the first device and broadcast third indication signaling, where the second indication signaling indicates time-frequency resource positions of the pilot signals in the resource block, and the third indication signaling indicates time-frequency resource positions of the one or more auxiliary frequency-offset estimation signals in the resource block.

Alternatively or additionally, the resource block includes a control channel and a shared channel.

Alternatively or additionally, the one or more auxiliary frequency-offset estimation signals and the pilot signals are located within the control channel; or the one or more auxiliary frequency-offset estimation signals and the pilot signals are located within the shared channel; or for the one or more auxiliary frequency-offset estimation signals and the pilot signals, at least one of which is located within the control channel and at least one of which is located within the shared channel.

According to a fifth aspect of the examples of the present disclosure, there is provided an electronic device, and the electronic device includes:

one or more processors; and a memory for storing instructions executable by the one or more processors;

where the one or more processors are configured to implement the method of frequency-offset determination described in any one of the foregoing examples.

According to a sixth aspect of the examples of the present disclosure, there is provided an electronic device, and the electronic device includes:

one or more processors; and a memory for storing instructions executable by the one or more processors;

where the one or more processors are configured to implement the method of resource block transmission described in any one of the foregoing examples.

According to a seventh aspect of the examples of the present disclosure, there is provided a computer-readable storage medium having a computer program stored thereon, where the program, when being executed by one or more processors, implements the steps of the method of frequency-offset determination described in any one of the foregoing examples.

According to an eighth aspect of the examples of the present disclosure, there is provided a computer-readable storage medium having a computer program stored thereon, where the program, when being executed by one or more processors, implements the steps of the method of resource block transmission described in any one of the foregoing examples.

According to the examples of the present disclosure rather than a related art, through adding one or more auxiliary frequency-offset estimation signals into a resource block, without changing an original distribution of pilot signals in the resource block, a greater frequency offset can be calculated, so as to determine the frequency offset caused by the NR V2X communication on the high-frequency carrier.

BRIEF DESCRIPTION OF THE DRAWINGS

The drawings related to the description of the examples will be briefly introduced to explain the technical solutions provided by the examples of the present disclosure more clearly. It is obvious that, the drawings in the following description illustrate only some examples of the present disclosure, and based on these drawings, those of ordinary skill in the art may obtain other drawings without any creative work.

FIG. 28 is a schematic block diagram illustrating another apparatus for frequency-offset determination according to an example of the present disclosure.

FIG. 29 is a schematic block diagram illustrating another apparatus for frequency-offset determination according to an example of the present disclosure.

FIG. 36 is a schematic block diagram illustrating an apparatus for resource block transmission according to an example of the present disclosure.

FIG. 37 is a schematic block diagram illustrating another apparatus for resource block transmission according to an example of the present disclosure.

FIG. 38 is a schematic block diagram illustrating another apparatus for resource block transmission according to an example of the present disclosure.

DETAILED DESCRIPTION

The following, in conjunction with the drawings of the examples of the present disclosure, will clearly and completely describe the technical solutions provided in the examples of the present disclosure. It is obvious that the described examples are a part, but not all, of the examples of the present disclosure. Based on the examples provided in the present disclosure, all of other examples, which can be obtained by those of ordinary skill in the art without any creative work, shall fall within the protection scope of this application.

Figure 1:
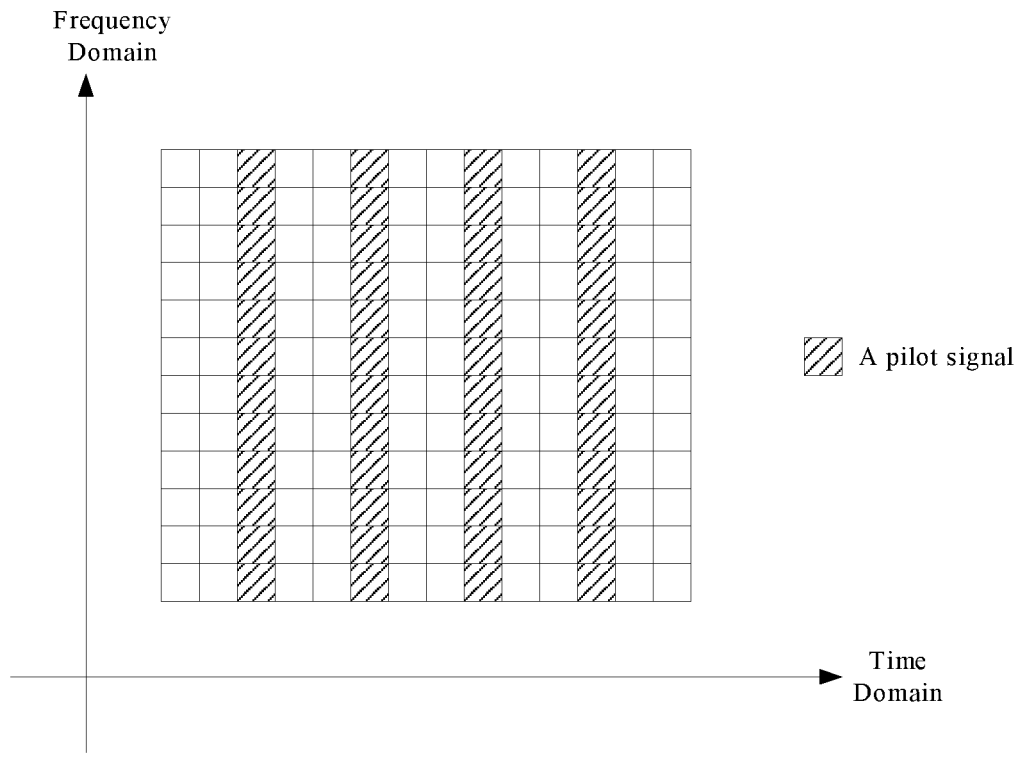
FIG. 1 is a schematic diagram of a distribution of pilot signals in a related art.
Figure 2:
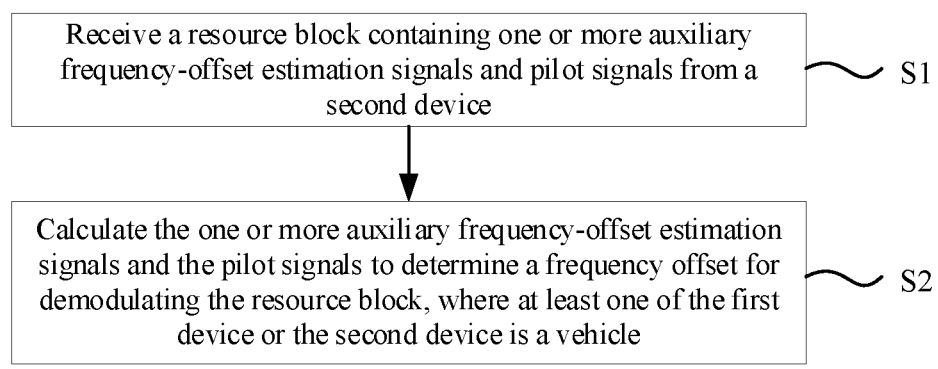
FIG. 2 is a schematic flowchart illustrating a method of frequency-offset determination according to an example of the present disclosure.

FIG. 2 is a schematic flowchart illustrating a method of frequency-offset determination according to an example of the present disclosure. The method of frequency-offset determination described in the example of the present disclosure is applicable to a first device in an NR V2X network. In particular, the V2X includes Vehicle-to-Vehicle (V2V), Vehicle-to-Infrastructure (V2I), Vehicle-to-Network (V2N), Vehicle-to-Pedestrian (V2P) and other communication ways.

As illustrated in FIG. 2, the method of frequency-offset determination may include the following steps.

At step S1, a resource block transmitted by a second device is received. The resource block contains one or more auxiliary frequency-offset estimation signals and pilot signals (which are also referred to as reference signals, for example, Demodulation Reference Signal or DMRS for short).

In an example, the one or more auxiliary frequency-offset estimation signals may be a Zadoff-chu (ZC) sequence, which has a strong auto-correlation and a low cross-correlation. The one or more auxiliary frequency-offset estimation signals may be generated in the same way as the pilot signals are generated, but are different from characters at some positions in a sequence of the pilot signals.

The following examples illustrate a relationship between the pilot signals and the one or more auxiliary frequency-offset estimation signals in the present disclosure. Take an example of the resource block which includes a control channel and a shared channel (or which can be configured as required to only include either the shared channel or the control channel). The control channel may be a physical sidelink control channel (PSCCH), and the shared channel may be a physical sidelink shared channel (PSSCH).

In an example, the resource block corresponds to a slot in a time domain and a plurality of subcarriers in a frequency domain. A slot may contain 14 symbols. A subcarrier spacing may be 15 kHz, 30 kHz, 60 kHz, etc., which can be set in detail as required. Based on different subcarrier spacings, different quantities of slots may be contained in one millisecond. For example, one millisecond may contain one slot if the subcarrier spacing is 15 kHz.

Figure 3:
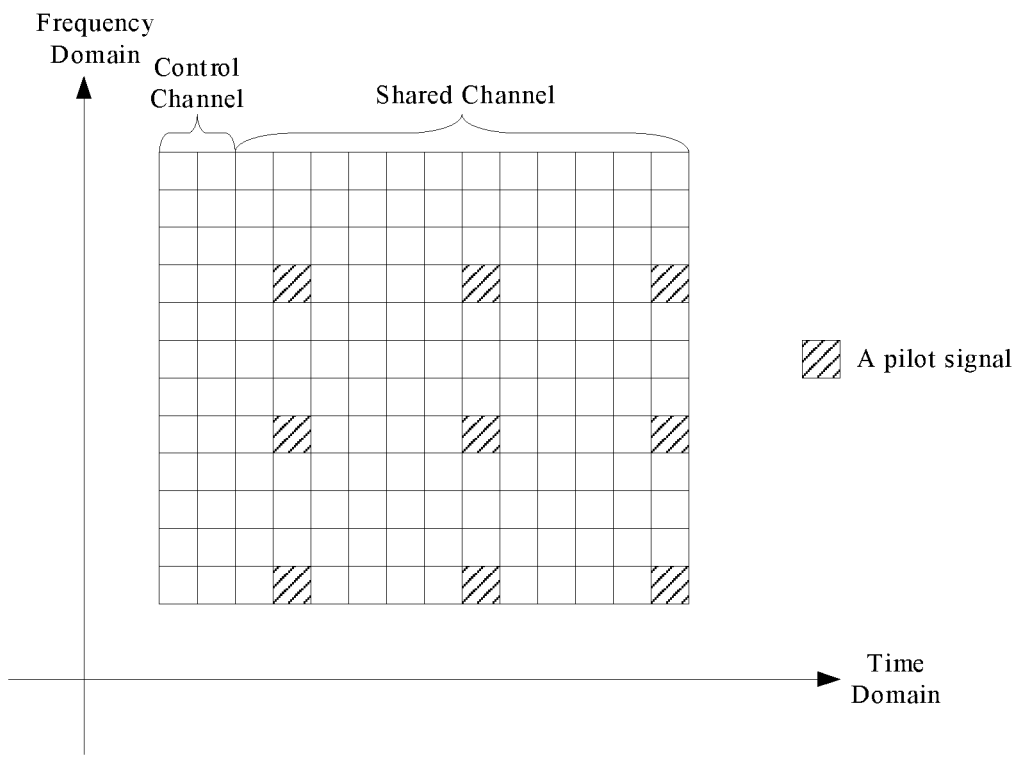
FIG. 3 is a schematic diagram illustrating a distribution of pilot signals according to an example of the present disclosure.

FIG. 3 is a schematic diagram illustrating a distribution of pilot signals according to an example of the present disclosure.

In an example, the distribution of the pilot signals may follow a pilot signal distribution in an NR physical uplink shared channel (PUSCH). In particular, in the resource block, the pilot signals occupy several symbols in the time domain, and do not occupy all the subcarriers in the frequency domain. As illustrated in FIG. 3, for example, in the resource block, the pilot signals occupy the 2nd, 7th, and 12th symbols of the shared channel in the time domain, and are located on the 4th, 8th, and 12th subcarriers in the frequency domain.

Figure 4:
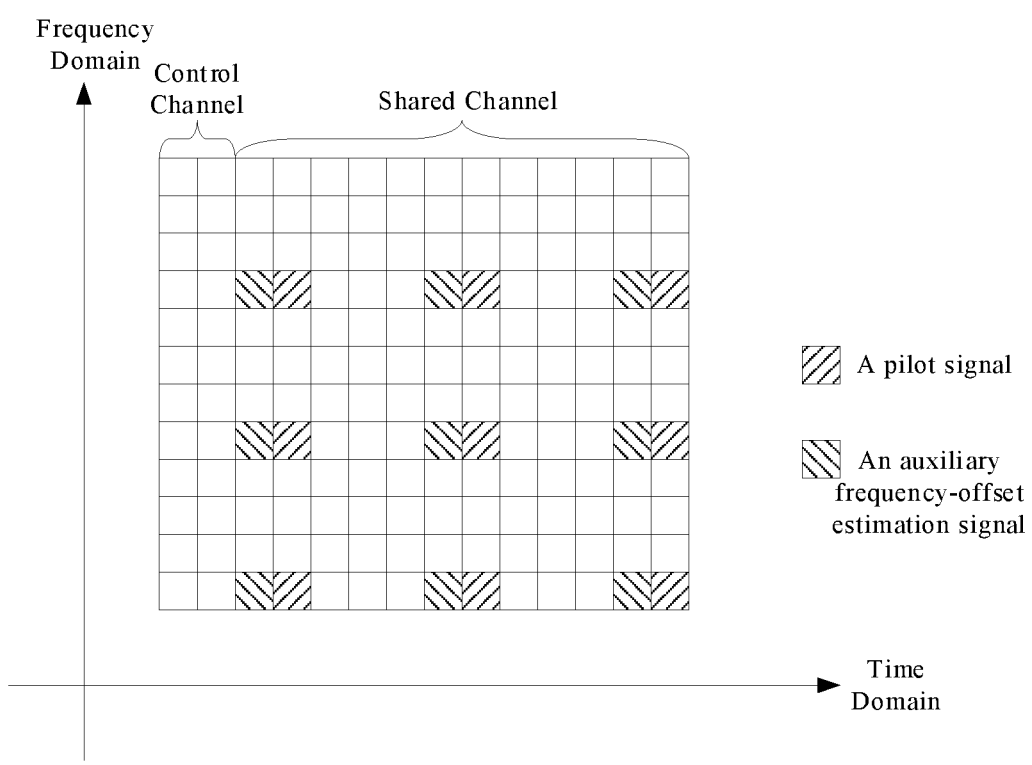
FIG. 4 is a schematic diagram illustrating a distribution of pilot signals and auxiliary frequency-offset estimation signals according to an example of the present disclosure.
Figure 5:
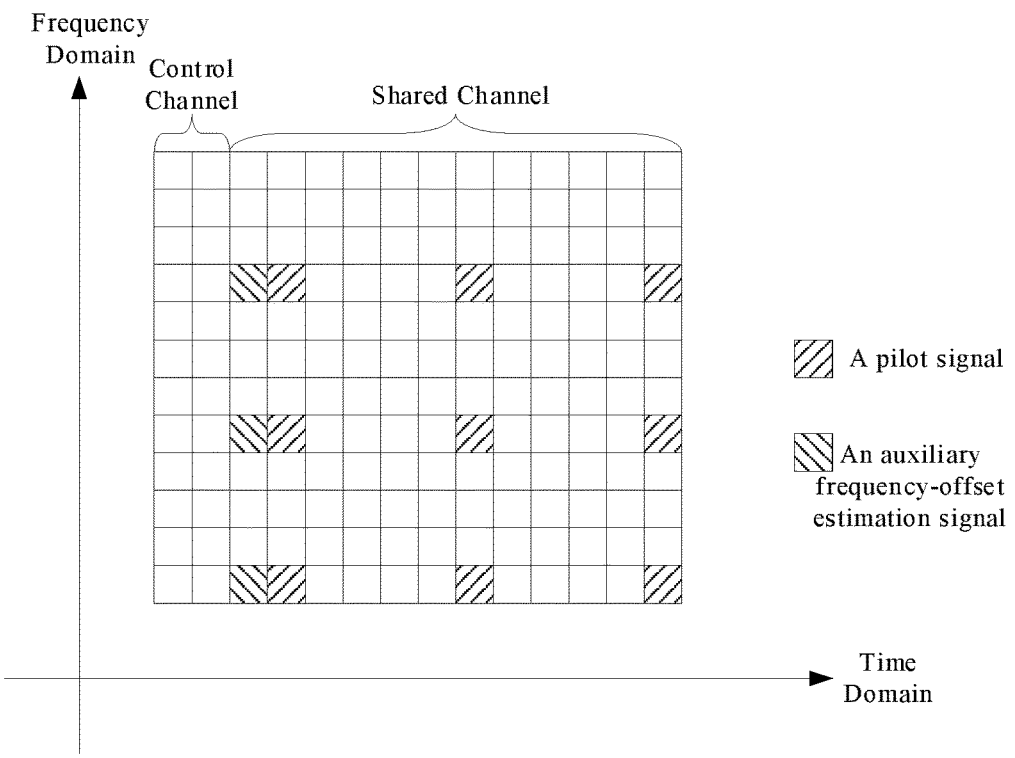
FIG. 5 is a schematic diagram illustrating another distribution of pilot signals and auxiliary frequency-offset estimation signals according to an example of the present disclosure.

FIG. 4 is a schematic diagram illustrating a distribution of pilot signals and auxiliary frequency-offset estimation signals according to an example of the present disclosure. FIG. 5 is a schematic diagram illustrating another distribution of pilot signals and auxiliary frequency-offset estimation signals according to an example of the present disclosure.

According to one or more examples of the present disclosure, in addition to the pilot signals as illustrated in FIG. 3, the resource block may also contain the one or more auxiliary frequency-offset estimation signals. The one or more auxiliary frequency-offset estimation signals and the pilot signals may be adjacent, for example, the one or more auxiliary frequency-offset estimation signals and the pilot signals are adjacent in the time domain. As illustrated in FIG. 4, for example, one auxiliary frequency-offset estimation signal is set on the previous symbol of each pilot signal separately. In this case, in the resource block, the pilot signals and the one or more auxiliary frequency-offset estimation signals are identical in quantity.

Or, one auxiliary frequency-offset estimation signal may only be set on the previous symbol of a part of the pilot signals. As illustrated in FIG. 5, for example, the auxiliary frequency-offset estimation signals are set on the previous symbol of three pilot signals that occupy the 2nd symbol of the shared channel. In this case, in the resource block, the pilot signals are larger than the one or more auxiliary frequency-offset estimation signals in quantity.

Or, one auxiliary frequency-offset estimation signal may be set on the next symbol of the pilot signals in other possible implementations, which are not specifically limited in the examples of the present disclosure.

Figure 6:
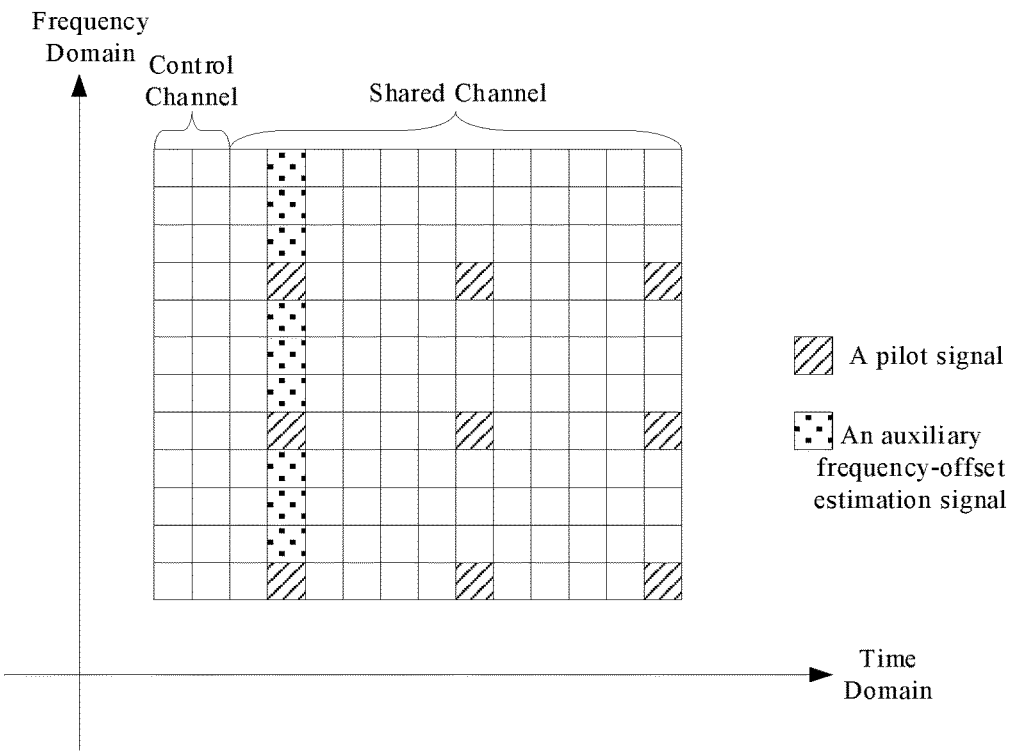
FIG. 6 is a schematic diagram illustrating another distribution of pilot signals and auxiliary frequency-offset estimation signals according to an example of the present disclosure.
Figure 7:
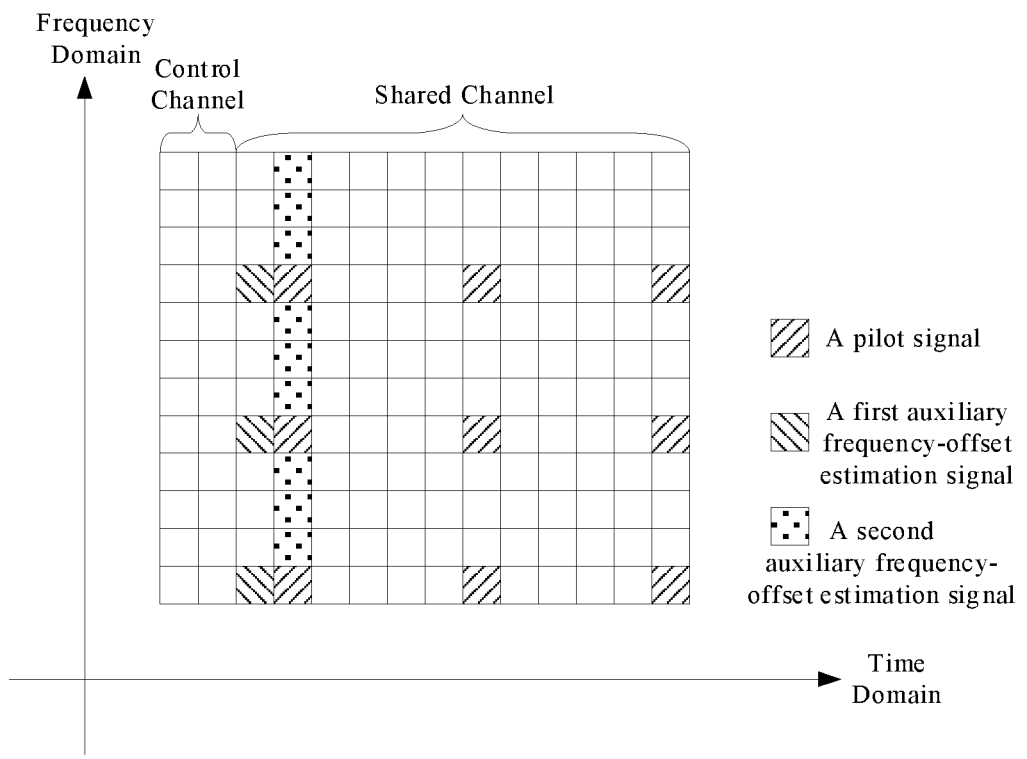
FIG. 7 is a schematic diagram illustrating another distribution of pilot signals and auxiliary frequency-offset estimation signals according to an example of the present disclosure.

FIG. 6 is a schematic diagram illustrating another distribution of pilot signals and auxiliary frequency-offset estimation signals according to an example of the present disclosure. FIG. 7 is a schematic diagram illustrating another distribution of pilot signals and auxiliary frequency-offset estimation signals according to an example of the present disclosure.

In an example, the one or more auxiliary frequency-offset estimation signals may also be set on one or more time-domain units on which the pilot signals are located. As illustrated in FIG. 6, for example, on the basis of the distribution of the pilot signals illustrated in FIG. 3, the auxiliary frequency-offset estimation signal and the pilot signals occupy the entire frequency domain on the 2nd symbol of the shared channel.

Alternatively, the one or more auxiliary frequency-offset estimation signals and the pilot signals may occupy the entire frequency domain on other symbol(s) of the shared channel in other possible implementations, which are not specifically limited in the examples of the present disclosure.

Moreover, on the basis of the example illustrated in FIG. 6, one or more auxiliary frequency-offset estimation signals that are adjacent to the pilot signals in the time domain may be also set. For example, by combining the example illustrated in FIG. 6 with the example illustrated in FIG. 4, it is illustrated in FIG. 7 that: first auxiliary frequency-offset estimation signals are adjacent to the pilot signals in the time domain, and specifically, the first auxiliary frequency-offset estimation signals are set on the 1st symbol of the shared channel and the pilot signals are set on the 2nd symbol of the shared channel; and meanwhile, second auxiliary frequency-offset estimation signals and the pilot signals occupy the entire frequency domain on at least one time-domain unit, and specifically, the second auxiliary frequency-offset estimation signals and the pilot signals occupy the entire frequency domain on the 2nd symbol.

Figure 8:
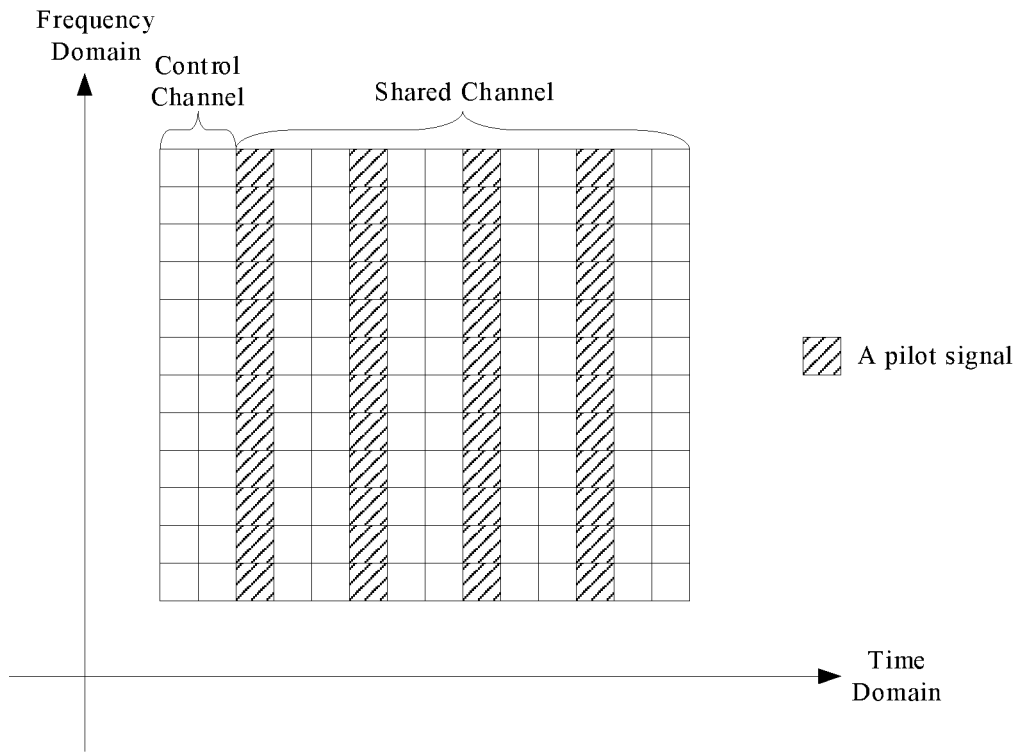
FIG. 8 is a schematic diagram illustrating another distribution of pilot signals according to an example of the present disclosure.

FIG. 8 is a schematic diagram illustrating another distribution of pilot signals according to an example of the present disclosure.

In an example, the distribution of the pilot signals may follow a pilot signal distribution in LTE V2X. In particular, in the resource block, the pilot signals occupy several symbols in the time domain, and occupy all the subcarriers in the frequency domain. As illustrated in FIG. 8, for example, in the resource block, the pilot signals occupy the 2nd, 7th, and 12th symbols of the shared channel in the time domain, and occupy all the 12 subcarriers in the frequency domain.

Figure 9:
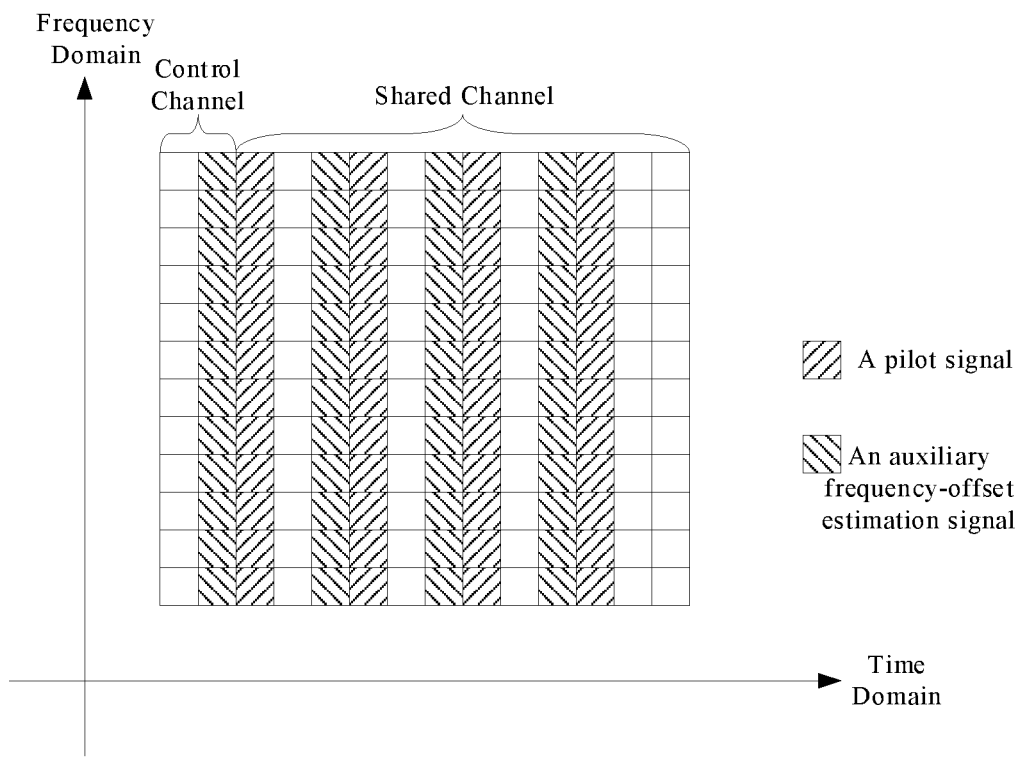
FIG. 9 is a schematic diagram illustrating another distribution of pilot signals and auxiliary frequency-offset estimation signals according to an example of the present disclosure.
Figure 10:
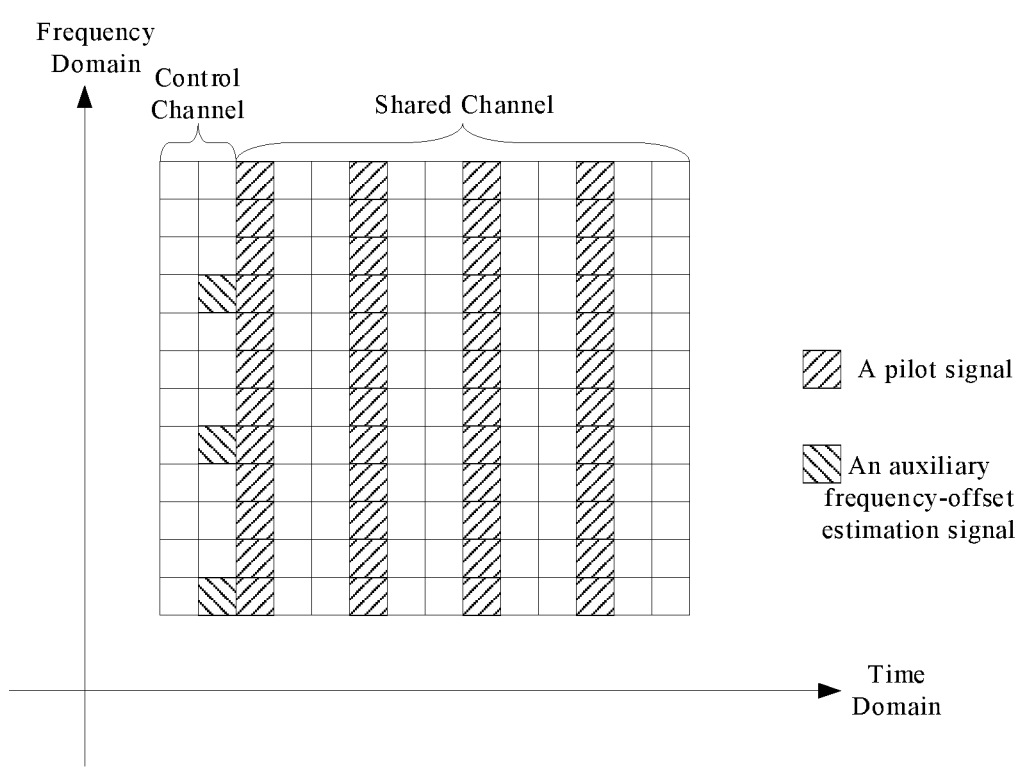
FIG. 10 is a schematic diagram illustrating another distribution of pilot signals and auxiliary frequency-offset estimation signals according to an example of the present disclosure.

FIG. 9 is a schematic diagram illustrating another distribution of pilot signals and auxiliary frequency-offset estimation signals according to an example of the present disclosure. FIG. 10 is a schematic diagram illustrating another distribution of pilot signals and auxiliary frequency-offset estimation signals according to an example of the present disclosure.

In an example, in addition to the pilot signal as illustrated in FIG. 8, the resource block may also include the one or more auxiliary frequency-offset estimation signals.

As illustrated in FIG. 9, for example, one auxiliary frequency-offset estimation signal is set on the previous symbol of each pilot signal separately. In this case, in the resource block, the pilot signals and the one or more auxiliary frequency-offset estimation signals are identical in quantity.

Alternatively, one auxiliary frequency-offset estimation signal may only be set on the previous symbol of a part of the pilot signals. As illustrated in FIG. 8, for example, the auxiliary frequency-offset estimation signals are set on the previous symbol of the pilot signals that occupy the 1st symbol of the shared channel and are located on the 4th, 8th and 12th subcarriers. In this case, in the resource block, the pilot signals are larger than the one or more auxiliary frequency-offset estimation signals in quantity.

For the above various examples, the relationship between the pilot signals and the one or more auxiliary frequency-offset estimation signals can be selected as required. Besides the above various examples, the relationship between the pilot signals and the one or more auxiliary frequency-offset estimation signals can be flexibly set as required. For example, the one or more auxiliary frequency-offset estimation signals may be located on the previous symbol of the pilot signals in the time domain, or may be located on the next symbol of the pilot signals in the time domain.

It should be noted that the relationships between the pilot signals and the one or more auxiliary frequency-offset estimation signals described in the foregoing various examples may be combined under a condition that no conflict occurs. For example, by combining the example illustrated in FIG. 6 with the example illustrated in FIG. 10, it may be configured in the resource block that a certain symbol is filled with the pilot signals and the auxiliary frequency-offset estimation signals, another symbol is filled with pilot signals, and a part of subcarriers corresponding to the previous symbol of said another symbol are set with auxiliary frequency-offset estimation signals.

At step S2, the one or more auxiliary frequency-offset estimation signals and the pilot signals are calculated to determine a frequency offset for demodulating the resource block. At least one of the first device or the second device is a vehicle.

In an example, the first device may communicate with the second device on the basis of the NR V2X network. For example, the first device may receive resource blocks from the second device or transmit resource blocks to the second device. When the first device transmits the resource blocks to the second device, the first device may be taken as the second device and the second device may be taken as the first device.

In an example, an algorithm adopted for calculating the pilot signals and the one or more auxiliary frequency-offset estimation signals may be a single-symbol estimation scheme, or a multi-column-pilot-combined phase calculation scheme.

In the single-symbol estimation scheme, it may perform calculations as follows: for the signals occupying the entire frequency domain on a certain symbol (which may only include the pilot signals, or may include the pilot signals and the one or more auxiliary frequency-offset estimation signals such as the pilot signals and the auxiliary frequency-offset estimation signals on the 2nd symbol of the shared channel as illustrated in FIG. 6); at the first step, the signals in a received resource block are converted to the time domain; at the second step, pre-stored local signals are converted to the time domain; at the third step, timing adjustment is performed on the signals in the received resource block; at the fourth step, it is to perform conjugate multiplication of the local signals and the received signals; at the fifth step, the conjugate of the second half of a sequence that is obtained via the conjugate multiplication in the fourth step is multiplied with the first half of the sequence; and at the sixth step, a phase of the result of the fifth step is derived, and then the frequency offset is calculated based on the phase.

In the multi-column-pilot-combined phase calculation scheme, it may perform calculations as follows. For an auxiliary frequency-offset estimation signal R1 in a received resource block, a channel estimation value H(n) may be calculated via dividing R1 by an auxiliary frequency-offset estimation signal D1 that is pre-stored locally. For a pilot signal in the received resource block, a channel estimation value H(n+1) may be calculated via dividing R2 by a pilot signal D2 that is pre-stored locally. The n represents a time-domain unit, for example, a sequence number of the symbol. It can be seen that, in one or more examples of the present disclosure, the auxiliary frequency-offset estimation signal and the pilot signal participating in the calculating process of the multi-column-pilot-combined phase calculation scheme are located on adjacent time-domain units. Thus, the phase is derived via a conjugate multiplication of H(n) and H(n+1), and the frequency offset may be obtained based on the phase. For a plurality of pairs of auxiliary frequency-offset estimation signals and pilot signals, a plurality of phases may be obtained. Therefore, it may calculate an average value of the plurality of phases and then calculate the frequency offset corresponding to the average value.

Taking the example illustrated in FIG. 4 as an instance, the auxiliary frequency-offset estimation signals on the 1st symbol of the shared channel and the pilot signals on the 2nd symbol of the shared channel may be calculated via the multi-column-pilot-combined phase calculation scheme. In particular, the auxiliary frequency-offset estimation signals on the 1st symbol of the shared channel as a column of signals and the pilot signals on the 2nd symbol of the shared channel as another column of signals participate in the calculation.

Taking the example illustrated in FIG. 10 as an instance, the auxiliary frequency-offset estimation signals on the 2nd symbol of the control channel and the pilot signals on the 1st symbol of the shared channel may be calculated via the multi-column-pilot-combined phase calculation scheme. In particular, the auxiliary frequency-offset estimation signals on the 2nd symbol of the control channel as a column of signals and the pilot signals on the 1st symbol of the shared channel as another column of signals participate in the calculation.

On the basis of the pilot signals that have been contained in the resource block, the one or more auxiliary frequency-offset estimation signals are additionally set. Thus, compared with two columns of reference signals participating in the calculation, the pilot signals and the one or more auxiliary frequency-offset estimation signals, which participate in the calculation in one or more examples of the present disclosure, are closer in the time domain, and therefore the calculable frequency offset is greater.

For example, a symbol length is $1/14$ milliseconds. Based only on the pilot signals in the example illustrated in FIG. 10, in which the nearest two columns of pilot signals are 3 symbols apart, the estimated frequency offset is about $0.43/(3/14$ milliseconds$)=2$ kHz. However, based on one or more examples of the present disclosure, since the auxiliary frequency-offset estimation signals and the pilot signals are adjacent, that is, they are at most 1 symbol apart, the estimated frequency offset may reach at least $0.43/(1/14$ milliseconds$)=6$ kHz, and even may reach 15 kHz at the most.

For example, for the example illustrated in FIG. 6, the pilot signals and the auxiliary frequency-offset estimation signals on the 2nd symbol of the shared channel may be calculated via the single-symbol estimation scheme.

For the example illustrated in FIG. 3, since the pilot signals do not occupy the entire frequency domain, only the multi-column-pilot-combined phase calculation scheme may be adopted to calculate the frequency offset. The frequency offset calculated via the multi-column-pilot-combined phase calculation scheme is relatively smaller than that calculated via the single-symbol estimation scheme. In one or more examples of the present disclosure, on the basis of the example illustrated in FIG. 3, the auxiliary frequency-offset estimation signals are additionally set in the resource block, and thereby the auxiliary frequency-offset estimation signals and the pilot signals may occupy the entire frequency domain on at least one time domain. For example, in the example illustrated in FIG. 6, the auxiliary frequency-offset estimation signals and the pilot signals occupy the entire frequency domain on the 2nd symbol of the shared channel. Thus, the pilot signals and the auxiliary frequency-offset estimation signals on the 2nd symbol of the shared channel may be calculated via the single-symbol estimation scheme, and thereby a greater frequency offset may be calculated.

It can be seen that, according to one or more examples of the present disclosure rather than the related art, through adding one or more auxiliary frequency-offset estimation signals into a resource block, without changing an original distribution of pilot signals in the resource block, a greater frequency offset can be calculated, so as to determine a frequency offset caused by an NR V2X communication on a high-frequency carrier.

Figure 11:
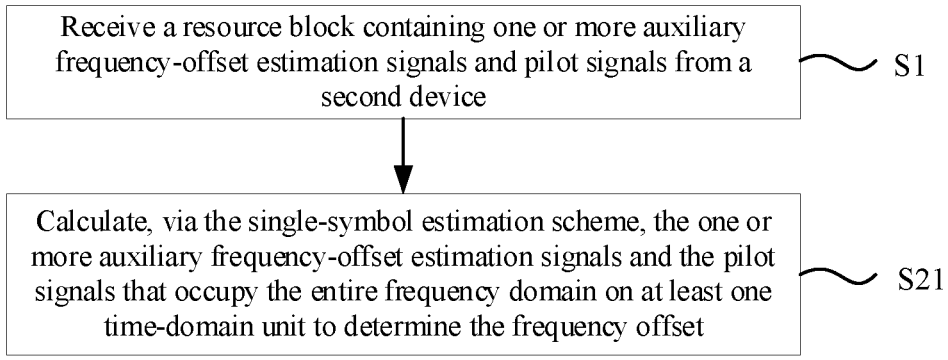
FIG. 11 is a schematic flowchart illustrating another method of frequency-offset determination according to an example of the present disclosure.

FIG. 11 is a schematic flowchart illustrating another method of frequency-offset determination according to an example of the present disclosure. As illustrated in FIG. 11, the one or more auxiliary frequency-offset estimation signals and the pilot signals occupy the entire frequency domain on at least one time-domain unit (that may be, for example, one or more symbols, and in the following examples it mainly take one symbol as one time-domain unit for illustration). The one or more auxiliary frequency-offset estimation signals and the pilot signals being calculated to determine the frequency offset for demodulating the resource block includes the following step.

At step S21, the one or more auxiliary frequency-offset estimation signals and the pilot signals that occupy the entire frequency domain on at least one time-domain unit are calculated via the single-symbol estimation scheme to determine the frequency offset.

In an example, in the case where the one or more auxiliary frequency-offset estimation signals and the pilot signals occupy the entire frequency domain on at least one time-domain unit, for example, when the auxiliary frequency-offset estimation signals and the pilot signals occupy the entire frequency domain on the 2nd symbol of the shared channel in the example illustrated in FIG. 6, the auxiliary frequency-offset estimation signals and the pilot signals occupying the entire frequency domain on the 2nd symbol of the shared channel may be calculated via the single-symbol estimation scheme to determine a greater frequency offset, so as to subsequently determine a frequency for demodulating the resource block.

Figure 12:
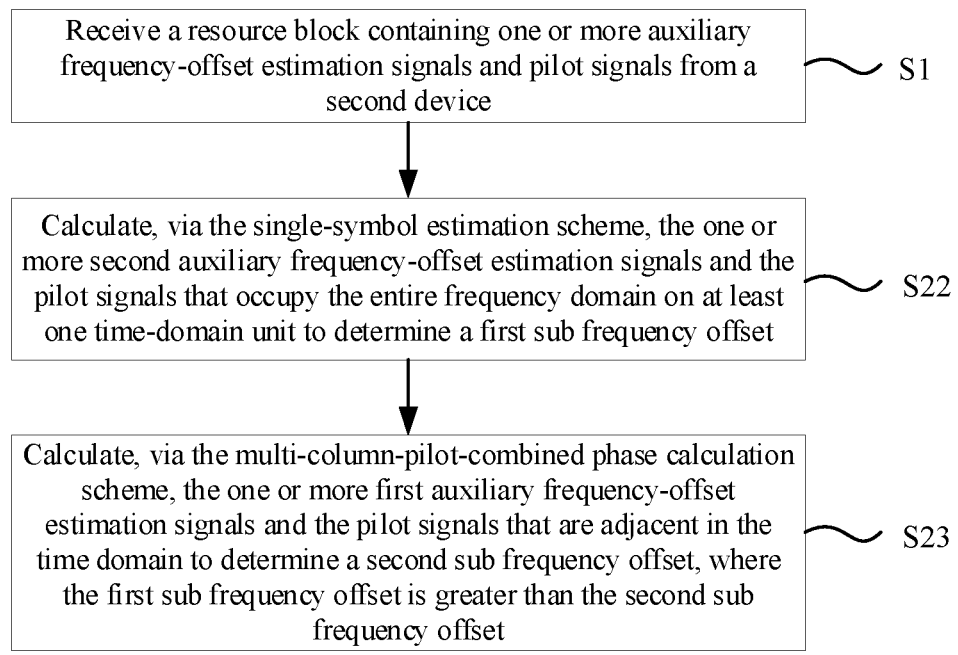
FIG. 12 is a schematic flowchart illustrating another method of frequency-offset determination according to an example of the present disclosure.

FIG. 12 is a schematic flowchart illustrating another method of frequency-offset determination according to an example of the present disclosure. As illustrated in FIG. 12, the one or more auxiliary frequency-offset estimation signals include one or more first auxiliary frequency-offset estimation signals and one or more second auxiliary frequency-offset estimation signals. The one or more first auxiliary frequency-offset estimation signals and the pilot signals are adjacent in the time domain, and the one or more second auxiliary frequency-offset estimation signals and the pilot signals occupy the entire frequency domain on at least one time-domain unit. The one or more auxiliary frequency-offset estimation signals and the pilot signals being calculated to determine the frequency offset for demodulating the resource block includes the following steps.

At step S22, the one or more second auxiliary frequency-offset estimation signals and the pilot signals that occupy the entire frequency domain on at least one time-domain unit are calculated via the single-symbol estimation scheme to determine a first sub frequency offset.

At step S23, the one or more first auxiliary frequency-offset estimation signals and the pilot signals that are adjacent in the time domain are calculated via the multi-column-pilot-combined phase calculation scheme to determine a second sub frequency offset. The first sub frequency offset is greater than the second sub frequency offset.

The execution sequence of step S22 and step S23 described above is not in a particular order, and can be set as required.

In an example, the one or more first auxiliary frequency-offset estimation signals and the pilot signals are adjacent in the time domain, and the one or more second auxiliary frequency-offset estimation signals and the pilot signals occupy the entire frequency domain on at least one time-domain unit. Taking the example illustrated in FIG. 7 as an instance, the first auxiliary frequency-offset estimation signals and the pilot signals are adjacent in the time domain on the 4th, 8th and 12th subcarriers, and the second auxiliary frequency-offset estimation signal and the pilot signals occupy the entire frequency domain on the 2nd symbol of the shared channel.

In this case, the one or more second auxiliary frequency-offset estimation signals and the pilot signals that occupy the entire frequency domain on at least one time-domain unit are calculated via the single-symbol estimation scheme, for example, the auxiliary frequency-offset estimation signals and the pilot signals that occupy the entire frequency domain on the 2nd symbol of the shared channel in the example as illustrated in FIG. 7 are calculated, so as to determine the larger first sub frequency offset. Further, the one or more first auxiliary frequency-offset estimation signals and the pilot signals that are adjacent in the time domain are calculated via the multi-column-pilot-combined phase calculation scheme, for example, the first auxiliary frequency-offset estimation signals and the pilot signals on the 4th, 8th and 12th subcarriers in the example as illustrated in FIG. 7 are calculated via the multi-column-pilot-combined phase calculation scheme, so as to determine the smaller second sub frequency offset.

The frequency offset obtained in one or more examples of the present disclosure is used to determine the frequency for demodulating the resource block. The greater the frequency offset, the lower the accuracy of the determined frequency, but easier to determine in a large range the frequency offset caused by the NR V2X communication on the high-frequency carrier. Therefore, in one or more examples of the present disclosure, the second sub frequency offset may further be determined in addition to determining the first sub frequency offset. Thus, the frequency of the received resource block can be firstly adjusted in a large range based on the first sub frequency offset to satisfy an adjustment for the frequency offset caused by the NR V2X communication on the high-frequency carrier, and then be adjusted in a small range based on the second sub frequency offset to accurately determine a range of the frequency of the received resource block.

Figure 13:
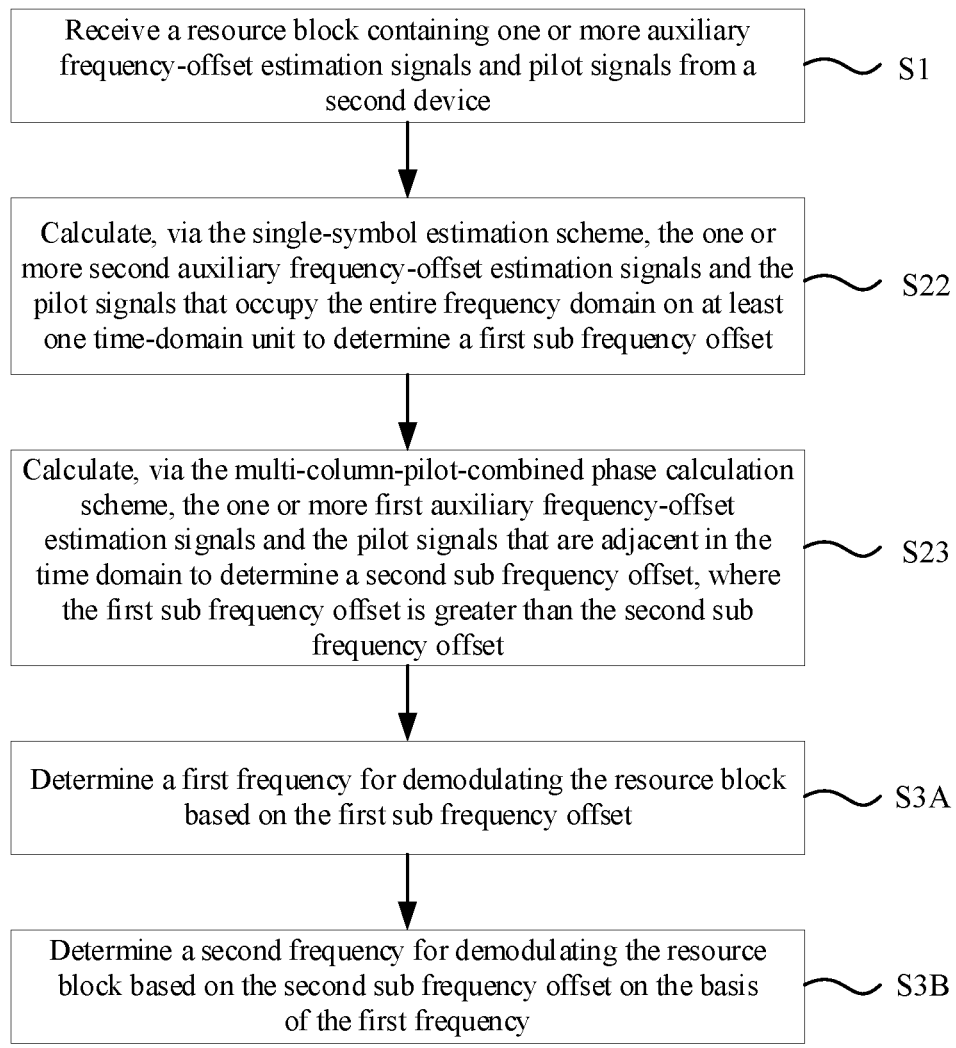
FIG. 13 is a schematic flowchart illustrating another method of frequency-offset determination according to an example of the present disclosure.

FIG. 13 is a schematic flowchart illustrating another method of frequency-offset determination according to an example of the present disclosure. As illustrated in FIG. 13, the method further includes the following steps.

At step S3A, a first frequency for demodulating the resource block is determined based on the first sub frequency offset.

At step S3B, a second frequency for demodulating the resource block is determined based on the second sub frequency offset on the basis of the first frequency.

In an example, the first frequency for demodulating the resource block may be firstly determined in a larger range based on the first sub frequency offset to satisfy the adjustment for the frequency offset caused by the NR V2X communication on the high-frequency carrier, and then the second frequency for demodulating the resource block may be determined in a smaller range based on the second sub frequency offset on the basis of the first frequency to accurately determine the frequency for demodulating the resource block.

For example, the first sub frequency offset is 15 kHz, and the first frequency for demodulating the resource block, which is determined based on the first sub frequency offset, is 40 kHz; and the second sub frequency offset is 6 kHz, and the second frequency for demodulating the resource block, which is determined based on the second sub frequency offset on the basis of the first frequency, is 34 kHz or 46 kHz. Therefore, compared with the first frequency that is determined only based on the first sub frequency offset, the second frequency with higher accuracy can be obtained.

Figure 14:
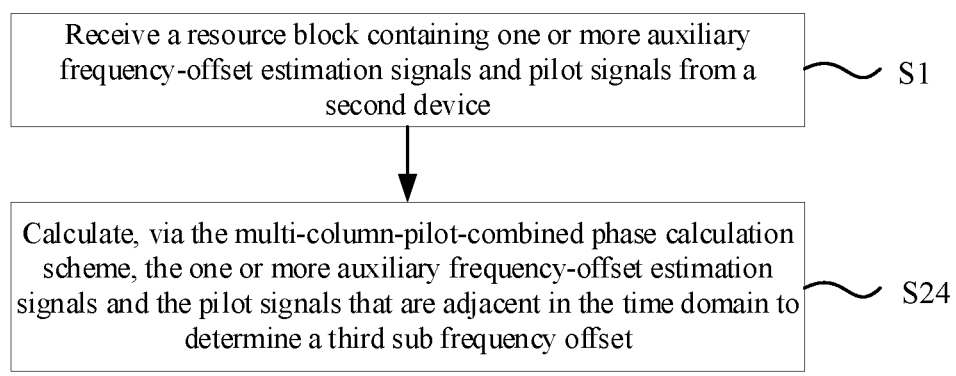
FIG. 14 is a schematic flowchart illustrating another method of frequency-offset determination according to an example of the present disclosure.

FIG. 14 is a schematic flowchart illustrating another method of frequency-offset determination according to an example of the present disclosure. As illustrated in FIG. 14, the one or more auxiliary frequency-offset estimation signals and the pilot signals are adjacent in the time domain. The one or more auxiliary frequency-offset estimation signals and the pilot signals being calculated to determine the frequency offset for demodulating the resource block includes the following step.

At step S24, the one or more auxiliary frequency-offset estimation signals and the pilot signals that are adjacent in the time domain are calculated via the multi-column-pilot-combined phase calculation scheme to determine a third sub frequency offset.

In an example, for the one or more auxiliary frequency-offset estimation signals and the pilot signals that are adjacent in the time domain, they may be calculated via the multi-column-pilot-combined phase calculation scheme. Taking the example illustrated in FIG. 5 as an instance, the auxiliary frequency-offset estimation signals on the 1st symbol of the shared channel and the pilot signals on the 2nd symbol of the shared channel may be calculated via the multi-column-pilot-combined phase calculation scheme to determine the third sub frequency offset. Or, taking the example illustrated in FIG. 9 as an instance, the auxiliary frequency-offset estimation signals on the 2nd symbol of the control channel and the pilot signals on the 1st symbol of the shared channel may be calculated via the multi-column-pilot-combined phase calculation scheme to determine the third sub frequency offset.

By calculating the one or more auxiliary frequency-offset estimation signals and the pilot signals that are adjacent in the time domain via the multi-column-pilot-combined phase calculation scheme, rather than calculating pilot signals which are not adjacent in the time domain, a greater frequency offset can be obtained due to the adjacent auxiliary frequency-offset estimation signals and pilot signals in the time domain, which is convenient for determining the frequency offset caused by the NR V2X communication on the high-frequency carrier.

Figure 15:
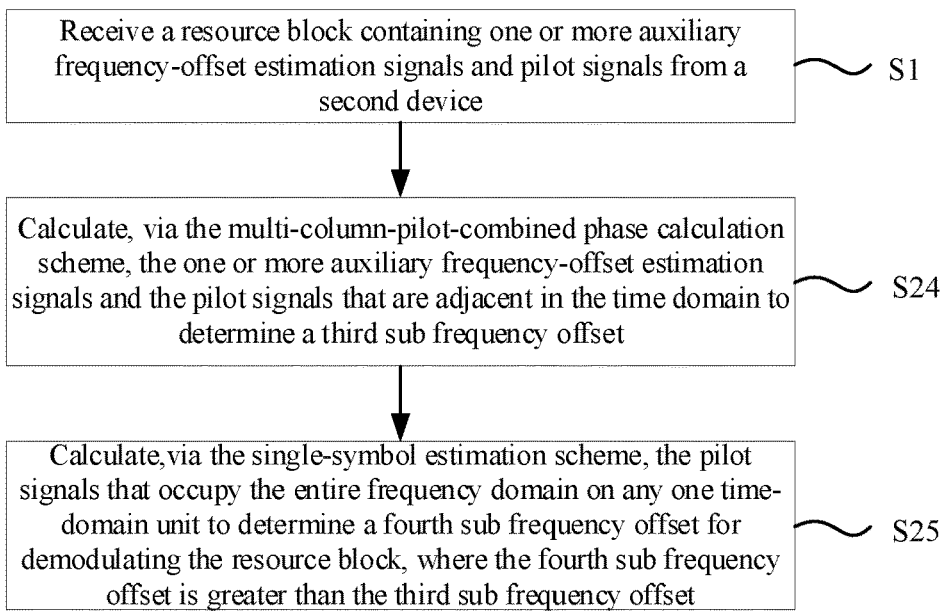
FIG. 15 is a schematic flowchart illustrating another method of frequency-offset determination according to an example of the present disclosure.

FIG. 15 is a schematic flowchart illustrating another method of frequency-offset determination according to an example of the present disclosure. As illustrated in FIG. 15, the pilot signals occupy the entire frequency domain on at least one time-domain unit. The one or more auxiliary frequency-offset estimation signals and the pilot signals being calculated to determine the frequency offset for demodulating the resource block includes the following step.

At step S25, the pilot signals that occupy the entire frequency domain on any one time-domain unit are calculated via the single-symbol estimation scheme to determine a fourth sub frequency offset for demodulating the resource block. The fourth sub frequency offset is greater than the third sub frequency offset.

The execution sequence of step S24 and step S25 described above is not in a particular order, and can be set as required.

In an example, the pilot signals occupy the entire frequency domain on at least one time domain unit. Taking the example illustrated in FIG. 10 as an instance, the pilot signals occupy the entire frequency domain on the 1st symbol of the shared channel. In this case, the pilot signals that occupy the entire frequency domain on at least one time domain unit may be calculated via the single-symbol estimation scheme, for example, the pilot signals that occupy the entire frequency domain on the 1st symbol of the shared channel in the example illustrated in FIG. 10 may be calculated, so as to determine the greater fourth sub frequency offset.

The frequency offset obtained in one or more examples of the present disclosure is used to determine the frequency for demodulating the resource block. The smaller the frequency offset, the higher the accuracy of the determined frequency, and more difficult to determine in a large range the frequency offset caused by the NR V2X communication on the high-frequency carrier. Therefore, in one or more examples of the present disclosure, the fourth sub frequency offset may further be determined in addition to determining the third sub frequency offset, so that the frequency of the received resource block can be firstly adjusted in a large range based on the fourth sub frequency offset to satisfy the adjustment for the frequency offset caused by the NR V2X communication on the high-frequency carrier, and then be adjusted in a small range based on the third sub frequency offset to accurately determine the range of the frequency of the received resource block.

Figure 16:
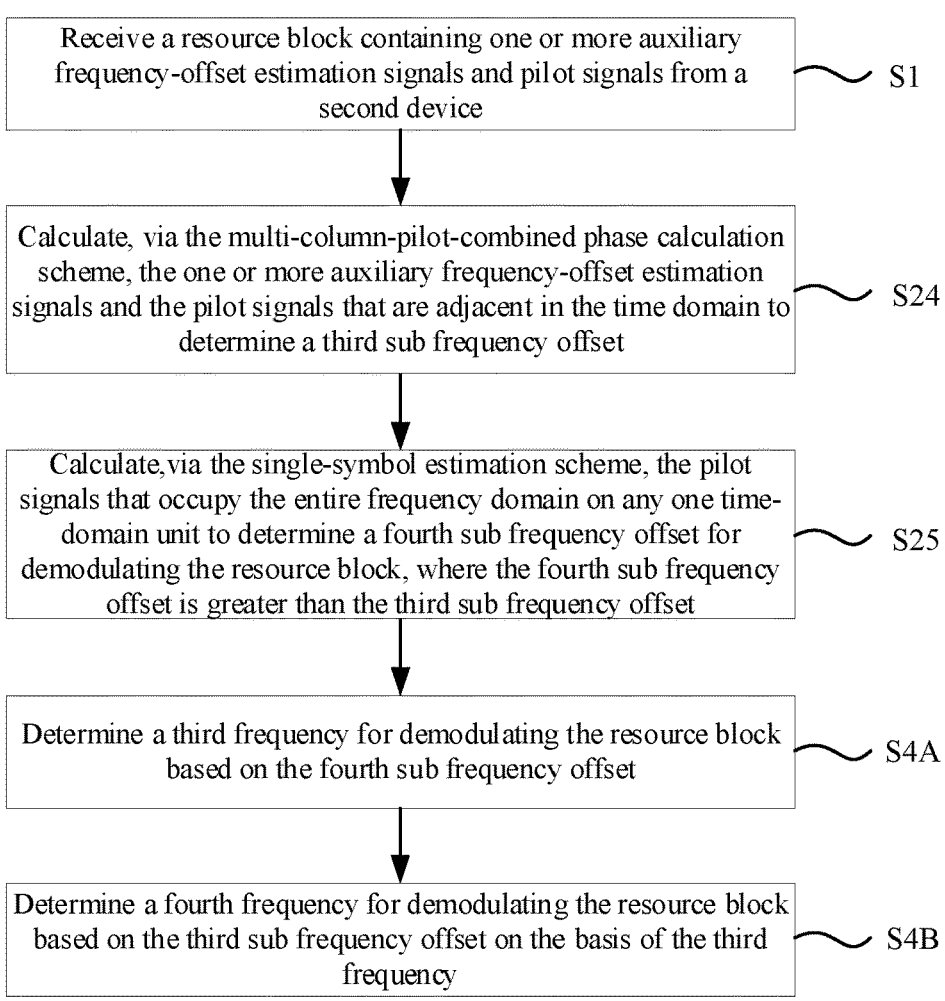
FIG. 16 is a schematic flowchart illustrating another method of frequency-offset determination according to an example of the present disclosure.

FIG. 16 is a schematic flowchart illustrating another method of frequency-offset determination according to an example of the present disclosure. As illustrated in FIG. 16, the method further includes the following steps.

At step S4A, a third frequency for demodulating the resource block is determined based on the fourth sub frequency offset.

At step S4B, a fourth frequency for demodulating the resource block is determined based on the third sub frequency offset on the basis of the third frequency.

In an example, the third frequency for demodulating the resource block may be firstly determined in a larger range based on the fourth sub frequency offset to satisfy the adjustment for the frequency offset caused by the NR V2X communication on the high-frequency carrier, and then be determined in a smaller range based on the third sub frequency offset on the basis of the third frequency to accurately determine the frequency for demodulating the resource block.

For example, the fourth sub frequency offset is 15 kHz, and the third frequency for demodulating the resource block, which is determined based on the fourth sub frequency offset, is 40 kHz; and the third sub frequency offset is 6 kHz, and the fourth frequency for demodulating the resource block, which is determined based on the third sub frequency offset on the basis of the third frequency, is 34 kHz or 46 kHz. Therefore, compared with the third frequency that is determined only based on the fourth sub frequency offset, the fourth frequency with higher accuracy can be obtained.

Figure 17:
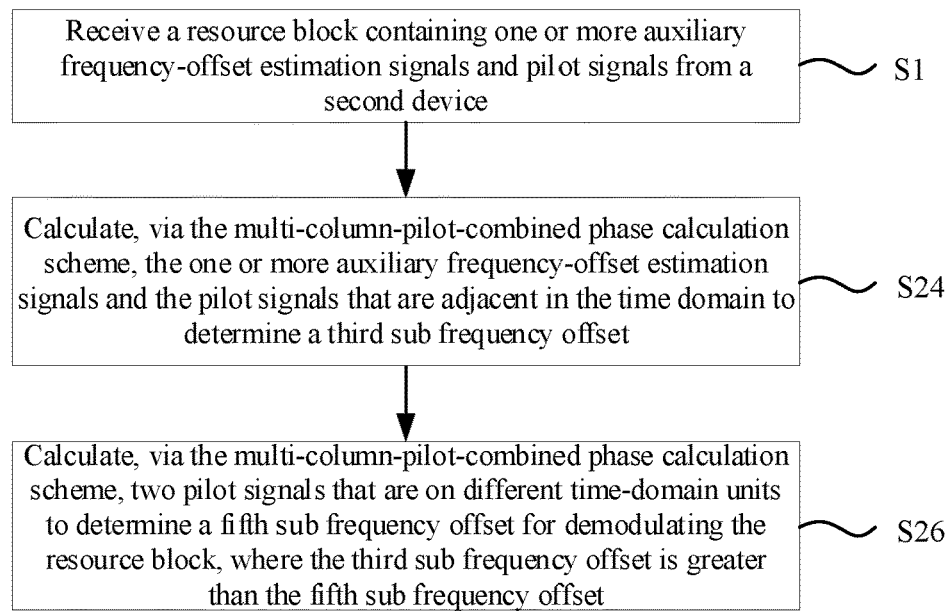
FIG. 17 is a schematic flowchart illustrating another method of frequency-offset determination according to an example of the present disclosure.

FIG. 17 is a schematic flowchart illustrating another method of frequency-offset determination according to an example of the present disclosure. As illustrated in FIG. 17, the pilot signals do not occupy the entire frequency domain on any one time-domain unit. The one or more auxiliary frequency-offset estimation signals and the pilot signals being calculated to determine the frequency offset for demodulating the resource block further includes the following step.

At step S26, two pilot signals that are on different time-domain units are calculated via the multi-column-pilot-combined phase calculation scheme to determine a fifth sub frequency offset for demodulating the resource block. The third sub frequency offset is greater than the fifth sub frequency offset.

The execution sequence of step S24 and step S26 described above is not in a particular order, and can be set as required.

In an example, the pilot signals do not occupy the entire frequency domain on any one time-domain unit. Taking the example illustrated in FIG. 5 as an instance, the pilot signals are set on three symbols but not occupy the entire frequency domain on each symbol. In this case, two pilot signals on different time-domain units, for example, the pilot signals on the 2nd and 7th symbols of the shared channel in the example illustrated in FIG. 5, may be calculated via the multi-column-pilot-combined phase calculation scheme to determine the smaller fifth sub frequency offset.

Comparing with the fifth sub frequency offset that is obtained through calculating two pilot signals on different time-domain units via the multi-column-pilot-combined phase calculation scheme, the third sub frequency offset is greater since it is obtained through calculating the one or more auxiliary frequency-offset estimation signals and the pilot signals that are adjacent in the time domain via the multi-column-pilot-combined phase calculation scheme. The greater the frequency offset, the lower the accuracy of the determined frequency, but easier to determine in a large range the frequency offset caused by the NR V2X communication on the high-frequency carrier. Therefore, in one or more examples of the present invention, the fifth sub frequency offset is further determined in addition to the determined third sub frequency offset, so that the frequency of the received resource block can be firstly adjusted in a large range based on the third sub frequency offset to satisfy the adjustment for the frequency offset caused by the NR V2X communication on the high-frequency carrier, and then be adjusted in a small range based on the fifth sub frequency offset to accurately determine the range of the frequency of the received resource block.

Figure 18:
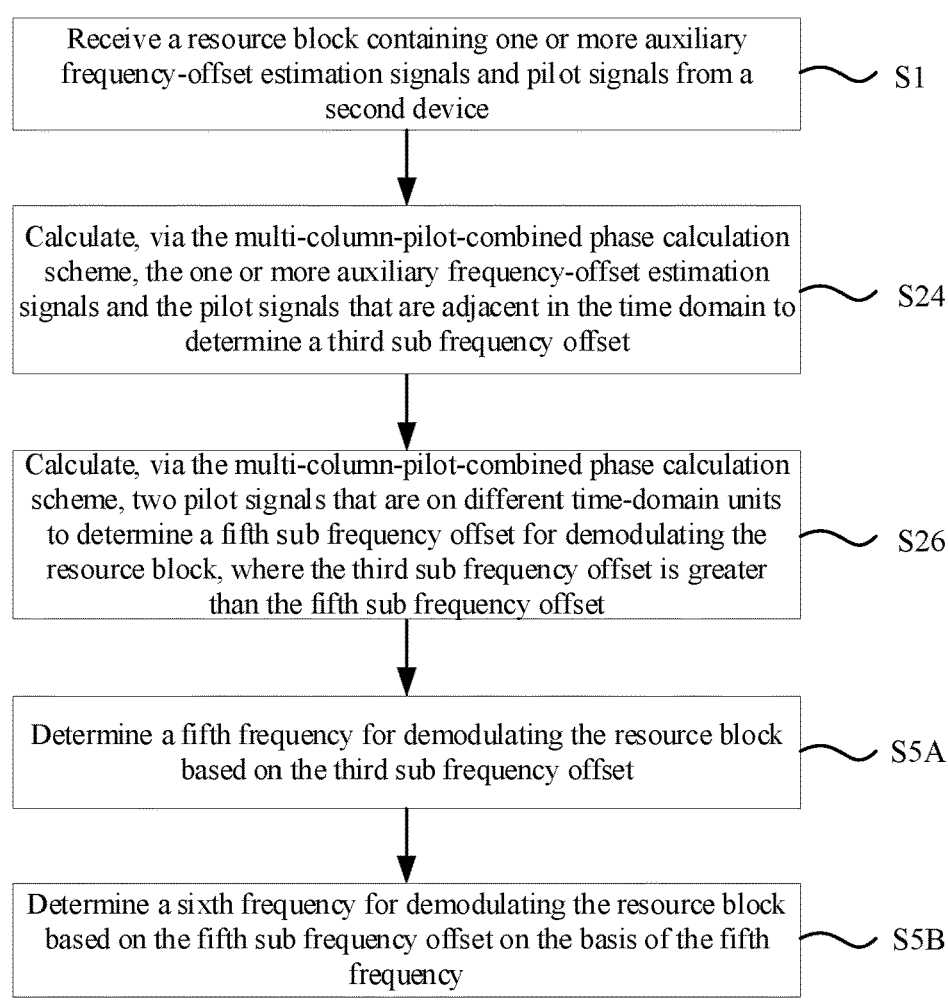
FIG. 18 is a schematic flowchart illustrating another method of frequency-offset determination according to an example of the present disclosure.

FIG. 18 is a schematic flowchart illustrating another method of frequency-offset determination according to an example of the present disclosure. As illustrated in FIG. 18, the method further includes the following steps.

At step S5A, a fifth frequency for demodulating the resource block is determined based on the third sub frequency offset.

At step S5B, a sixth frequency for demodulating the resource block is determined based on the fifth sub frequency offset on the basis of the fifth frequency.

In an example, the fifth frequency for demodulating the resource block may be firstly determined in a larger range based on the third sub frequency offset to satisfy the adjustment for the frequency offset caused by the NR V2X communication on the high-frequency carrier, and then the sixth frequency for demodulating the resource block may be determined in a smaller range based on the fifth sub frequency offset on the basis of the fifth frequency to accurately determine the frequency for demodulating the resource block.

For example, the third sub frequency offset is 6 kHz, and the fifth frequency for demodulating the resource block, which is determined based on the third sub frequency offset, is 40 kHz; and the fifth sub frequency offset is 2 kHz, and the sixth frequency for demodulating the resource block, which is determined based on the fifth sub frequency offset on the basis of the fifth frequency, is 38 kHz or 42 kHz. Therefore, compared with the fifth frequency that is determined only based on the third sub frequency offset, the sixth frequency with higher accuracy can be obtained.

Figure 19:
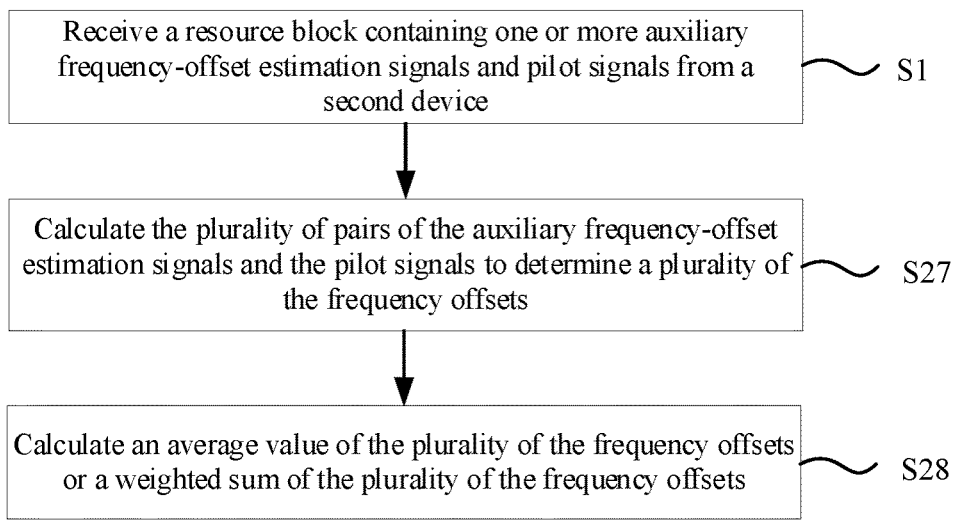
FIG. 19 is a schematic flowchart illustrating another method of frequency-offset determination according to an example of the present disclosure.

FIG. 19 is a schematic flowchart illustrating another method of frequency-offset determination according to an example of the present disclosure. As illustrated in FIG. 19, if the resource block contains a plurality of pairs of the auxiliary frequency-offset estimation signals and the pilot signals, the one or more auxiliary frequency-offset estimation signals and the pilot signals being calculated to determine the frequency offset for demodulating the resource block further includes the following steps.

At step S27, the plurality of pairs of the auxiliary frequency-offset estimation signals and the pilot signals are calculated to determine a plurality of the frequency offsets.

At step S28, an average value of the plurality of the frequency offsets or a weighted sum of the plurality of the frequency offsets is calculated.

In an example, the resource block contains the plurality of pairs of the auxiliary frequency-offset estimation signals and the pilot signals, such as in the examples illustrated in FIG. 4, FIG. 5, FIG. 7, FIG. 9 and FIG. 10. Taking the example illustrated in FIG. 5 as an instance, there occur three pairs of auxiliary frequency-offset estimation signals and pilot signals which are adjacent in the time domain separately. Then, three frequency offsets may be determined through calculating the three pairs of auxiliary frequency-offset estimation signals and pilot signals via the multi-column-pilot-combined phase calculation scheme. Further, the average value or the weighted sum of the three obtained frequency offsets may be calculated as a final frequency offset.

In addition to calculating the average value and the weighted sum, other approaches may also be selected to process the plurality of the frequency offsets, which can be set as required.

Alternatively or additionally, the one or more auxiliary frequency-offset estimation signals and the pilot signals are identical in quantity in the resource block.

In an example, the one or more auxiliary frequency-offset estimation signals in the same quantity as the pilot signals are configured in the resource block. For example, in accordance with the configuration mode in the example illustrated in FIG. 4 or FIG. 9, one auxiliary frequency-offset estimation signal is configured before each pilot signal.

Figure 20:
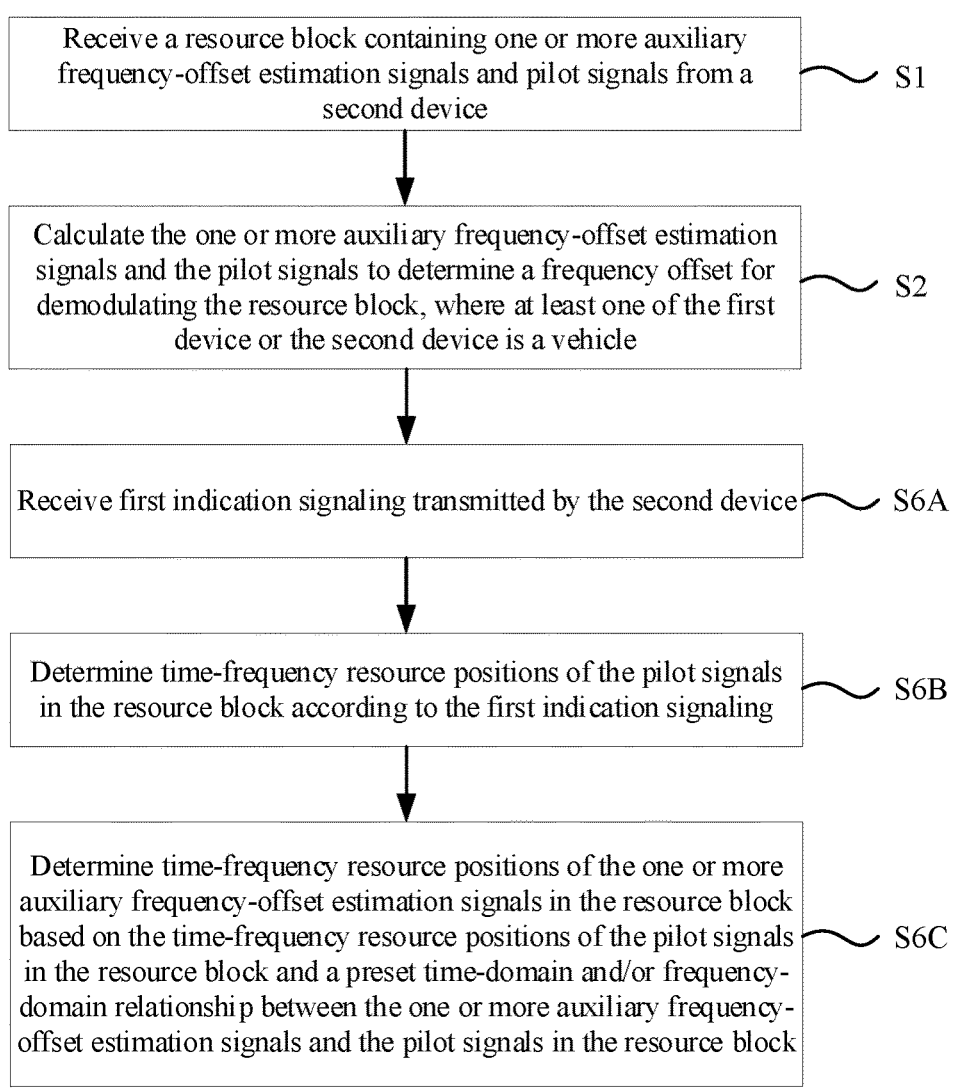
FIG. 20 is a schematic flowchart illustrating another method of frequency-offset determination according to an example of the present disclosure.

FIG. 20 is a schematic flowchart illustrating another method of frequency-offset determination according to an example of the present disclosure. As illustrated in FIG. 20, the method further includes the following steps.

At step S6A, first indication signaling transmitted by the second device is received.

At step S6B, time-frequency resource positions of the pilot signals in the resource block are determined according to the first indication signaling.

At step S6C, time-frequency resource positions of the one or more auxiliary frequency-offset estimation signals in the resource block are determined based on the time-frequency resource positions of the pilot signals in the resource block and a preset time-domain and/or frequency-domain relationship between the one or more auxiliary frequency-offset estimation signals and the pilot signals in the resource block.

In an example, the second device may inform the first device of the time-frequency resource positions of the pilot signals through transmitting the first indication signaling. Moreover, since the pilot signals and the one or more auxiliary frequency-offset estimation signals are identical in quantity in the resource block, the first device may also be informed through one piece of signaling (for example, the above first indication signaling) of a pre-determined time-domain and/or frequency-domain relationship between the one or more auxiliary frequency-offset estimation signals and the pilot signals in the resource block (which satisfies the above preset relationship), such as the one or more auxiliary frequency-offset estimation signals being located on the time-frequency resources before or after the pilot signals.

The first device can determine the time-frequency resource positions of the pilot signals according to the first indication signaling, and then determine the time-frequency resource positions of the one or more auxiliary frequency-offset estimation signals based on the time-frequency resource positions of the pilot signals in the resource block and the preset time-domain and/or frequency-domain relationship between the one or more auxiliary frequency-offset estimation signals and the pilot signals in the resource block. For example, the preset relationship between the one or more auxiliary frequency-offset estimation signals and the pilot signals includes that the one or more auxiliary frequency-offset estimation signals are located on the previous symbol of the pilot signals, and thus the time-frequency resource positions of the one or more auxiliary frequency-offset estimation signals are located on the previous symbol of the pilot signals.

Alternatively or additionally, the pilot signals are larger than the one or more auxiliary frequency-offset estimation signals in quantity in the resource block.

In an example, the one or more auxiliary frequency-offset estimation signals in different quantity from the pilot signals are configured in the resource block, and specifically, the pilot signals are larger than the one or more auxiliary frequency-offset estimation signals in quantity. For example, in accordance with the configuration mode in the example illustrated in FIG. 5 or FIG. 10, the auxiliary frequency-offset estimation signals are configured on the previous symbol of only the three pilot signals.

Figure 21:
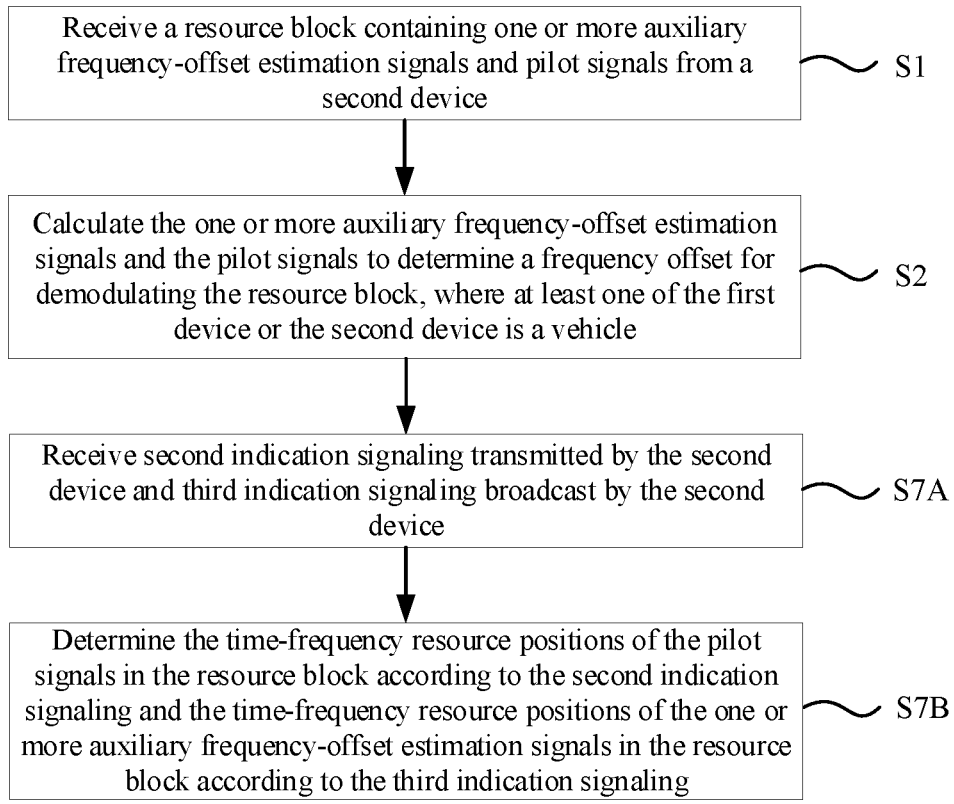
FIG. 21 is a schematic flowchart illustrating another method of frequency-offset determination according to an example of the present disclosure.

FIG. 21 is a schematic flowchart illustrating another method of frequency-offset determination according to an example of the present disclosure. As illustrated in FIG. 21, the method further includes the following steps.

At step S7A, second indication signaling transmitted by the second device and third indication signaling broadcast by the second device are received.

At step S7B, the time-frequency resource positions of the pilot signals in the resource block are determined according to the second indication signaling, and the time-frequency resource positions of the one or more auxiliary frequency-offset estimation signals in the resource block are determined according to the third indication signaling.

In an example, if the pilot signals are larger than the one or more auxiliary frequency-offset estimation signals in quantity in the resource block, the time-domain and/or frequency-domain relationship between the one or more auxiliary frequency-offset estimation signals and the pilot signals in the resource block may be not determined in advance. When the second device informs of the time-frequency resource positions at which the pilot signals and the one or more auxiliary frequency-offset estimation signals are located in the resource block, only one piece of signaling is not enough to make the first device determine the time-frequency resource positions at which the pilot signals and the one or more auxiliary frequency-offset estimation signals are located.

In one or more examples of the present disclosure, the second device may transmit the second indication signaling to the first device, and broadcast the third indication signaling (to make other devices that are able to communicate with the second device be informed of the time-frequency resource positions of the one or more auxiliary frequency-offset estimation signals), so that the first device can determine the time-frequency resource positions of the pilot signals according to the second indication signaling, and determine the time-frequency resource positions of the one or more auxiliary frequency-offset estimation signals according to the third indication signaling.

Alternatively or additionally, the resource block includes a control channel and a shared channel.

In an example, the resource block may include the control channel and the shared channel, and the control channel may carry signaling, and the shared channel may carry data.

Figure 22:
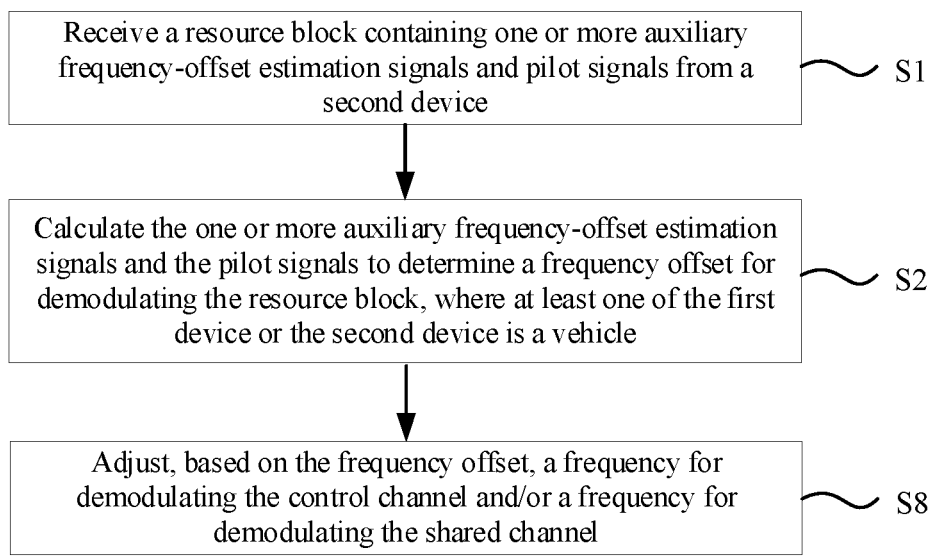
FIG. 22 is a schematic flowchart illustrating another method of frequency-offset determination according to an example of the present disclosure.

FIG. 22 is a schematic flowchart illustrating another method of frequency-offset determination according to an example of the present disclosure. As illustrated in FIG. 22, the method further includes the following step.

At step S8, a frequency for demodulating the control channel and/or a frequency for demodulating the shared channel are adjusted based on the frequency offset.

In an example, it may adjust, based on the obtained frequency offset, the frequency for demodulating the control channel or the frequency for demodulating the shared channel, which can be specifically achieved by configuring the first device as required.

Figure 23:
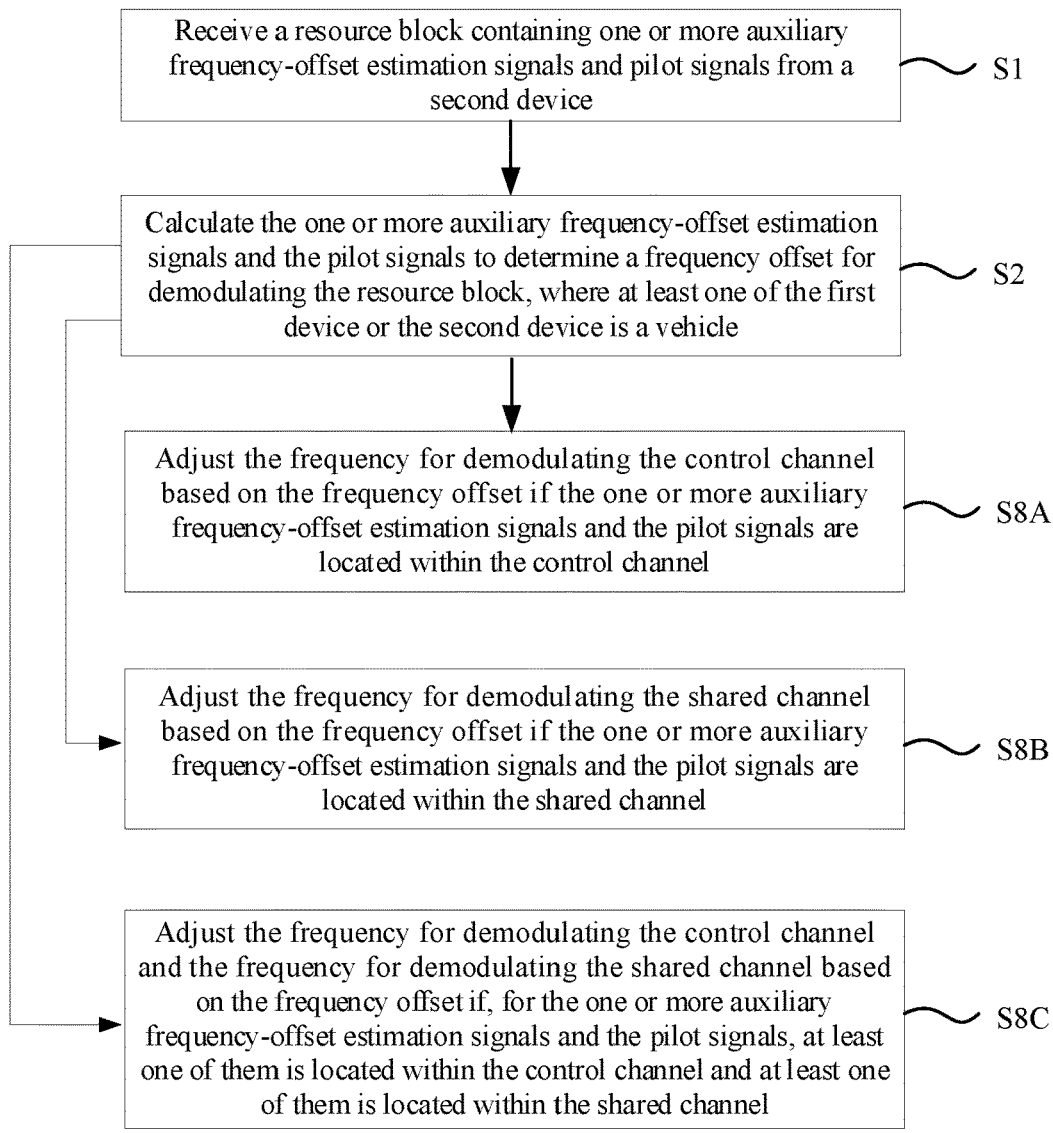
FIG. 23 is a schematic flowchart illustrating another method of frequency-offset determination according to an example of the present disclosure.

FIG. 23 is a schematic flowchart illustrating another method of frequency-offset determination according to an example of the present disclosure. As illustrated in FIG. 23, the frequency for demodulating the control channel and/or the frequency for demodulating the shared channel being adjusted based on the frequency offset includes the following steps.

At step S8A, if the one or more auxiliary frequency-offset estimation signals and the pilot signals are located within the control channel, the frequency for demodulating the control channel is adjusted based on the frequency offset.

In an example, in the case where the one or more auxiliary frequency-offset estimation signals and the pilot signals are located within the control channel, the frequency for demodulating the control channel may be adjusted based on the frequency offset.

At step S8B, if the one or more auxiliary frequency-offset estimation signals and the pilot signals are located within the shared channel, the frequency for demodulating the shared channel is adjusted based on the frequency offset.

In an example, in the case where the one or more auxiliary frequency-offset estimation signals and the pilot signals are located within the shared channel, the frequency for demodulating the shared channel may be adjusted based on the frequency offset.

At step S8C, for the one or more auxiliary frequency-offset estimation signals and the pilot signals, if at least one of them is located within the control channel and at least one of them is located within the shared channel, the frequency for demodulating the control channel and the frequency for demodulating the shared channel are adjusted based on the frequency offset.

In an example, for the one or more auxiliary frequency-offset estimation signals and the pilot signals, in the case where at least one of them is located within the control channel and at least one of them is located within the shared channel, the frequency for demodulating the control channel and the frequency for demodulating the shared channel may be adjusted based on the frequency offset.

For the one or more auxiliary frequency-offset estimation signals and the pilot signals, at least one of them is located within the control channel and at least one of them is located within the shared channel, which may include at least one case of:

all of the one or more auxiliary frequency-offset estimation signals being located within the control channel and all of the pilot signals being located within the shared channel; all of the pilot signals being located within the control channel and all of the one or more auxiliary frequency-offset estimation signals being located within the shared channel; the one or more auxiliary frequency-offset estimation signals being located within both the control channel and the shared channel, and all of the pilot signals being located within the shared channel; the pilot signals being located within both the control channel and the shared channel, and all of the one or more auxiliary frequency-offset estimation signals being located within the shared channel; and, the one or more auxiliary frequency-offset estimation signals being located within both the control channel and the shared channel, and the pilot signals being located within both the control channel and the shared channel.

Moreover, for the one or more auxiliary frequency-offset estimation signals and the pilot signals, at least one of them is located within the control channel and at least one of them is located within the shared channel, which can be achieved specifically by selecting one or more cases describe above as required.

According to one or more examples of the present disclosure, it can be determined whether the obtained frequency offset is specifically used to adjust the frequency for demodulating the control channel or the shared channel based on the channel(s) within which the one or more auxiliary frequency-offset estimation signals and the pilot signals are located in the resource block, so as to control, through configuring the time-frequency resource positions in the resource block of the one or more auxiliary frequency-offset estimation signals and the pilot signals, the way that the first device uses the frequency offset, thereby improving the flexibility of controlling the first device.

Figure 24:
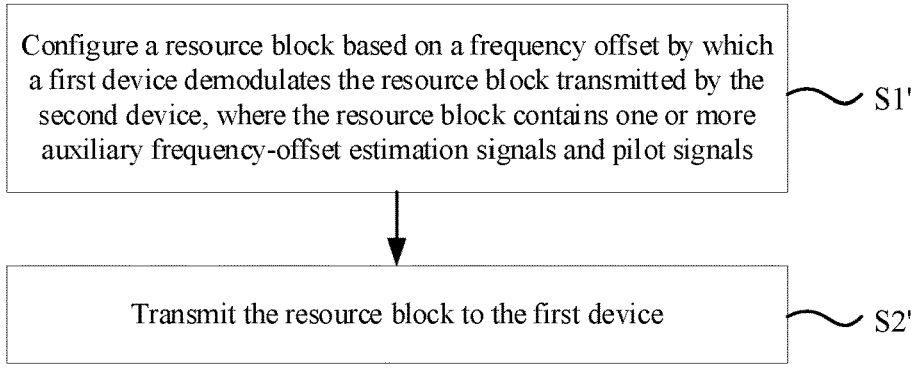
FIG. 24 is a schematic flowchart illustrating a method of resource block transmission according to an example of the present disclosure.

FIG. 24 is a schematic flowchart illustrating a method of resource block transmission according to an example of the present disclosure. The method for resource block transmission described in the examples of the present disclosure is applicable to a second device in an NR V2X network. The second device can communicate with the first device described in any one of the above examples on the basis of the NR V2X network.

As illustrated in FIG. 24, the method of resource block transmission may include the following steps.

At step S1', a resource block is configured based on a frequency offset by which a first device demodulates the resource block transmitted by the second device. The resource block contains one or more auxiliary frequency-offset estimation signals and pilot signals.

At step S2', the resource block is transmitted to the first device.

In an example, when the second device communicates with the first device, the frequency offset, by which the first device demodulates the resource block transmitted by the second device, may be estimated based on information such as a movement speed and a position of the first device. Further, the resource block containing the one or more auxiliary frequency-offset estimation signals and the pilot signals may be configured based on the estimated frequency offset, so that the first device can determine the frequency offset for demodulating the resource block transmitted by the second device through calculating the one or more auxiliary frequency-offset estimation signals and the pilot signals. Thus, the first device can demodulate the resource block based on the frequency offset obtained from the calculation, so as to acquire signaling and data carried by one or more channels in the resource block and other comments.

The approach via which the first device calculates the pilot signals and the one or more auxiliary frequency-offset estimation signals may be implemented in accordance with the examples of the method of frequency-offset determination, which will not be repeated here.

Alternatively or additionally, the one or more auxiliary frequency-offset estimation signals and the pilot signals occupy an entire frequency domain on at least one time-domain unit.

In an example, the one or more auxiliary frequency-offset estimation signals and the pilot signals occupy the entire frequency domain on at least one time-domain unit. Taking the example illustrated in FIG. 6 as an instance, the auxiliary frequency-offset estimation signals and the pilot signals occupy the entire frequency domain on the 2nd symbol of the shared channel. In this case, the first device may calculate the auxiliary frequency-offset estimation signals and the pilot signals that occupy the entire frequency domain on the 2nd symbol of the shared channel via a single-symbol estimation scheme.

Alternatively or additionally, the one or more auxiliary frequency-offset estimation signals include one or more first auxiliary frequency-offset estimation signals and one or more second auxiliary frequency-offset estimation signals. The one or more first auxiliary frequency-offset estimation signals and the pilot signals are adjacent in a time domain, and the one or more second auxiliary frequency-offset estimation signals and the pilot signals occupy the entire frequency domain on at least one time-domain unit.

In an example, the one or more first auxiliary frequency-offset estimation signals and the pilot signals are adjacent in the time domain, and the one or more second auxiliary frequency-offset estimation signal and the pilot signals occupy the entire frequency domain on at least one time-domain unit. For example, in the example illustrated in FIG. 7, the first auxiliary frequency-offset estimation signals and the pilot signals are adjacent in the time domain on the 4th, 8th and 12th subcarriers, and the second auxiliary frequency-offset estimation signals and the pilot signals occupy the entire frequency domain on the 2nd symbol of the shared channel.

In this case, the first device may calculate the one or more second auxiliary frequency-offset estimation signals and the pilot signals that occupy the entire frequency domain on at least one time-domain unit via the single-symbol estimation scheme, for example, calculating the auxiliary frequency-offset estimation signals and the pilot signals that occupy the entire frequency domain on the 2nd symbol of the shared channel in the example as illustrated in FIG. 7, so as to determine a larger first sub frequency offset. Further, the first device may also calculate the one or more first auxiliary frequency-offset estimation signals and the pilot signals that are adjacent in the time domain via a multi-column-pilot-combined phase calculation scheme, for example, calculating the first auxiliary frequency-offset estimation signals and the pilot signals on the 4th, 8th and 12th subcarriers in the example as illustrated in FIG. 7 via the multi-column-pilot-combined phase calculation scheme, so as to determine a smaller second sub frequency offset.

Alternatively or additionally, the one or more auxiliary frequency-offset estimation signals and the pilot signals are adjacent in the time domain.

In an example, for the one or more auxiliary frequency-offset estimation signals and the pilot signals that are adjacent in the time domain, they may be calculated by the first device via the multi-column-pilot-combined phase calculation scheme. Taking the example illustrated in FIG. 5 as an instance, the first device may calculate the auxiliary frequency-offset estimation signals on the 1st symbol of the shared channel and the pilot signals on the 2nd symbol of the shared channel via the multi-column-pilot-combined phase calculation scheme to determine a third sub frequency offset. Or, taking the example illustrated in FIG. 9 as an instance, the first device may calculate the auxiliary frequency-offset estimation signals on the 2nd symbol of the control channel and the pilot signals on the 1st symbol of the shared channel via the multi-column-pilot-combined phase calculation scheme to determine the third sub frequency offset.

Alternatively or additionally, the pilot signals occupy the entire frequency domain on at least one time-domain unit.

In an example, the pilot signals occupy the entire frequency domain on at least one time domain unit, for example, in the example illustrated in FIG. 10, the pilot signals occupy the entire frequency domain on the 1st symbol of the shared channel. In this case, the first device may calculate the pilot signals that occupy the entire frequency domain on at least one time domain unit via the single-symbol estimation scheme, for example, calculating the pilot signals that occupy the entire frequency domain on the 1st symbol of the shared channel in the example illustrated in FIG. 10, so as to determine a greater fourth sub frequency offset.

Alternatively or additionally, the pilot signals do not occupy the entire frequency domain on any one time-domain unit.

In an example, the pilot signals do not occupy the entire frequency domain on any one time-domain unit, for example, in the example illustrated in FIG. 5, the pilot signals are set on three symbols but not occupy the entire frequency domain on each symbol. In this case, the first device may calculate two pilot signals on different time-domain units via the multi-column-pilot-combined phase calculation scheme, for example, calculating the pilot signals on the 2nd and 7th symbols of the shared channel in the example illustrated in FIG. 5, so as to determine a smaller fifth sub frequency offset.

Alternatively or additionally, the resource block contains a plurality of pairs of the auxiliary frequency-offset estimation signals and the pilot signals.

In an example, the resource block contains the plurality of pairs of auxiliary frequency-offset estimation signals and pilot signals, such as in the examples illustrated in FIG. 4, FIG. 5, FIG. 7, FIG. 9 and FIG. 10. Taking the example illustrated in FIG. 5 as an instance, there occur three pairs of auxiliary frequency-offset estimation signals and pilot signals which are adjacent in the time domain separately. Then, the first device may determine three frequency offsets through calculating the three pairs of auxiliary frequency-offset estimation signals and pilot signals via the multi-column-pilot-combined phase calculation scheme. Further, the first device may calculate an average value or a weighted sum of the three obtained frequency offsets as a final frequency offset.

Alternatively or additionally, the one or more auxiliary frequency-offset estimation signals and the pilot signals are identical in quantity in the resource block.

In an example, the one or more auxiliary frequency-offset estimation signals in the same quantity as the pilot signals may be configured in the resource block. For example, in accordance with the configuration mode in the example illustrated in FIG. 4 or FIG. 9, one auxiliary frequency-offset estimation signal is configured before each pilot signal.

Figure 25:
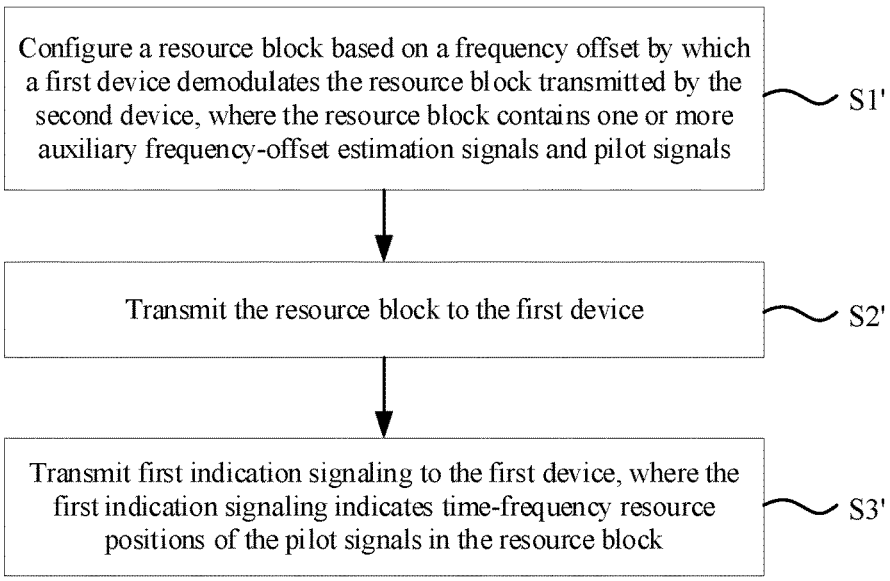
FIG. 25 is a schematic flowchart illustrating another method of resource block transmission according to an example of the present disclosure.

FIG. 25 is a schematic flowchart illustrating another method of resource block transmission according to an example of the present disclosure. As illustrated in FIG. 25, the method further includes the following step.

At step S3', first indication signaling is transmitted to the first device. The first indication signaling indicates time-frequency resource positions of the pilot signals in the resource block.

In an example, the second device may inform the first device of the time-frequency resource positions of the pilot signals by transmitting the first indication signaling. Moreover, since the pilot signals and the one or more auxiliary frequency-offset estimation signals are identical in quantity in the resource block, the second device may also inform the first device through one piece of signaling (for example, the above first indication signaling) of a pre-determined time-domain and/or frequency-domain relationship between the one or more auxiliary frequency-offset estimation signals and the pilot signals in the resource block (which satisfies the above preset relationship), such as the one or more auxiliary frequency-offset estimation signals being located on the time-frequency resources before or after the pilot signals.

The first device can determine the time-frequency resource positions of the pilot signals according to the first indication signaling, and then determine the time-frequency resource positions of the one or more auxiliary frequency-offset estimation signals in the resource block based on the time-frequency resource positions of the pilot signals in the resource block and the preset time-domain and/or frequency-domain relationship between the one or more auxiliary frequency-offset estimation signals and the pilot signals in the resource block. For example, the preset relationship between the one or more auxiliary frequency-offset estimation signals and the pilot signals includes that the one or more auxiliary frequency-offset estimation signals are located on the previous symbol of the pilot signals, and thus the time-frequency resource positions of the one or more auxiliary frequency-offset estimation signals are located on the previous symbol of the pilot signals.

Alternatively or additionally, the pilot signals are larger than the one or more auxiliary frequency-offset estimation signals in quantity in the resource block.

In an example, the one or more auxiliary frequency-offset estimation signals in different quantity from the pilot signals are configured in the resource block, and specifically, the pilot signals are larger than the one or more auxiliary frequency-offset estimation signals in quantity. For example, in accordance with the configuration mode in the example illustrated in FIG. 5 or FIG. 10, the auxiliary frequency-offset estimation signals are configured on the previous symbol of only the three pilot signals.

Figure 26:
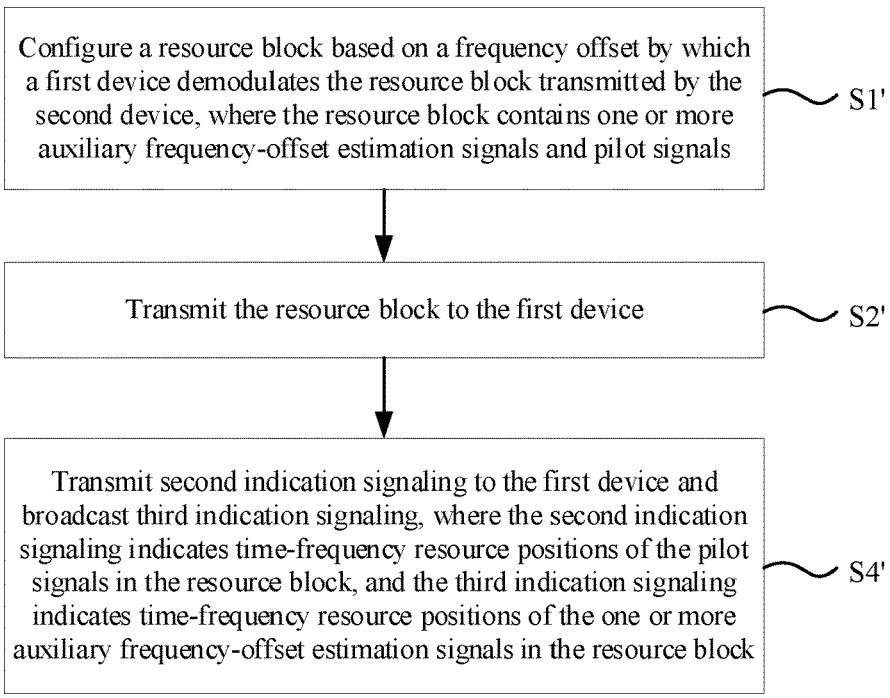
FIG. 26 is a schematic flowchart illustrating another method of resource block transmission according to an example of the present disclosure.

FIG. 26 is a schematic flowchart illustrating another method of resource block transmission according to an example of the present disclosure. As illustrated in FIG. 26, the method further includes the following step.

At step S4', second indication signaling is transmitted to the first device and third indication signaling is broadcast. The second indication signaling indicates time-frequency resource positions of the pilot signals in the resource block, and the third indication signaling indicates time-frequency resource positions of the one or more auxiliary frequency-offset estimation signals in the resource block.

In an example, if the pilot signals are larger than the one or more auxiliary frequency-offset estimation signals in quantity in the resource block, the time-domain and/or frequency-domain relationship between the one or more auxiliary frequency-offset estimation signals and the pilot signals in the resource block may be not determined in advance. When the second device indicates the time-frequency resource positions at which the pilot signals and the one or more auxiliary frequency-offset estimation signals are located in the resource block, only one piece of signaling is not enough to make the first device determine the time-frequency resource positions at which the pilot signals and the one or more auxiliary frequency-offset estimation signals are located.

In examples of the present disclosure, the second device may transmit the second indication signaling to the first device, and broadcast the third indication signaling (to make other devices that are able to communicate with the second device be informed of the time-frequency resource positions of the one or more auxiliary frequency-offset estimation signals), so that the first device can determine the time-frequency resource positions of the pilot signals according to the second indication signaling, and determine the time-frequency resource positions of the one or more auxiliary frequency-offset estimation signals according to the third indication signaling.

Alternatively or additionally, the resource block includes a control channel and a shared channel.

In an example, the resource block may include the control channel and the shared channel. The control channel may carry signaling, and the shared channel may carry data.

Alternatively or additionally, the one or more auxiliary frequency-offset estimation signals and the pilot signals are located within the control channel; or the one or more auxiliary frequency-offset estimation signals and the pilot signals are located within the shared channel; or for the one or more auxiliary frequency-offset estimation signals and the pilot signals, at least one of them is located within the control channel and at least one of them is located within the shared channel.

In an example, in the case where the one or more auxiliary frequency-offset estimation signals and the pilot signals are located within the control channel, the first device may adjust a frequency for demodulating the control channel based on the frequency offset.

In an example, in the case where the one or more auxiliary frequency-offset estimation signals and the pilot signals are located within the shared channel, the first device may adjust a frequency for demodulating the shared channel based on the frequency offset.

In an example, in the case where the one or more auxiliary frequency-offset estimation signals and the pilot signals are located within both the control channel and the shared channel, the first device may adjust the frequency for demodulating the control channel and the frequency for demodulating the shared channel based on the frequency offset.

According to one or more examples of the present disclosure, by configuring the time-frequency positions of the one or more auxiliary frequency-offset estimation signals and the pilot signals in the resource block, the second device can control the way that the first device uses the frequency offset, so that based on the channel(s) at which the one or more auxiliary frequency-offset estimation signals and the pilot signals are located in the resource block, the first device can determine whether the obtained frequency offset is used to adjust the frequency for demodulating the control channel or to adjust the frequency for demodulating the shared channel, thereby improving the flexibility of controlling the first device degree.

Corresponding to the foregoing method examples of frequency-offset determination and the foregoing method examples of resource block transmission, the present disclosure also provides apparatus examples for frequency-offset determination and apparatus examples for resource block transmission.

Figure 27:
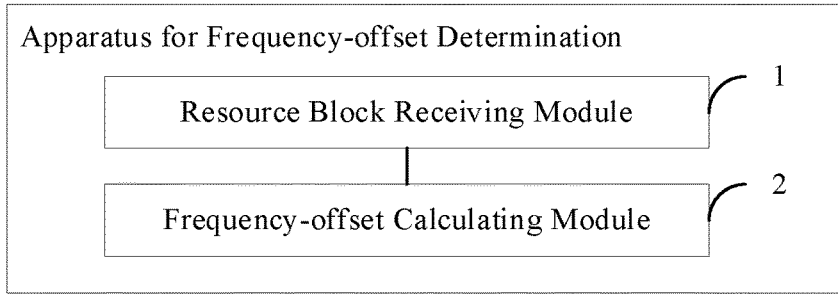
FIG. 27 is a schematic block diagram illustrating an apparatus for frequency-offset determination according to an example of the present disclosure.

FIG. 27 is a schematic block diagram illustrating an apparatus for frequency-offset determination according to an example of the present disclosure. The apparatus for frequency-offset determination described in the example of the present disclosure may be applicable to a first device in an NR V2X network.

As illustrated in FIG. 27, the apparatus for frequency-offset determination may include:

a resource block receiving module 1 that is configured to receive a resource block containing one or more auxiliary frequency-offset estimation signals and pilot signals from a second device; and a frequency-offset calculating module 2 that is configured to calculate the one or more auxiliary frequency-offset estimation signals and the pilot signals to determine a frequency offset for demodulating the resource block, where at least one of the first device or the second device is a vehicle.

Alternatively or additionally, the one or more auxiliary frequency-offset estimation signals and the pilot signals occupy an entire frequency domain on at least one time-domain unit, where the frequency-offset calculating module is configured to calculate, via a single-symbol estimating device, the one or more auxiliary frequency-offset estimation signals and the pilot signals that occupy the entire frequency domain on at least one time-domain unit to determine the frequency offset.

FIG. 28 is a schematic block diagram illustrating another apparatus for frequency-offset determination according to an example of the present disclosure. As illustrated in FIG. 28, the one or more auxiliary frequency-offset estimation signals include one or more first auxiliary frequency-offset estimation signals and one or more second auxiliary frequency-offset estimation signals. The one or more first auxiliary frequency-offset estimation signals and the pilot signals are adjacent in a time domain, and the one or more second auxiliary frequency-offset estimation signals and the pilot signals occupy the entire frequency domain on at least one time-domain unit. The frequency-offset calculating module 2 includes:

a first calculating submodule 21 that is configured to calculate, via a single-symbol estimation device, the one or more second auxiliary frequency-offset estimation signals and the pilot signals that occupy the entire frequency domain on at least one time-domain unit to determine a first sub frequency offset; and a second calculating submodule 22 that is configured to calculate, via a multi-column-pilot-combined phase calculation device, the one or more first auxiliary frequency-offset estimation signals and the pilot signals that are adjacent in the time domain to determine a second sub frequency offset, where the first sub frequency offset is greater than the second sub frequency offset.

FIG. 29 is a schematic block diagram illustrating another apparatus for frequency-offset determination according to an example of the present disclosure. As illustrated in FIG. 29, the apparatus further includes:

a first determining module 3A that is configured to determine, based on the first sub frequency offset, a first frequency for demodulating the resource block; and a second determining module 3B that is configured to determine, based on the second sub frequency offset, a second frequency for demodulating the resource block on a basis of the first frequency.

Alternatively or additionally, the one or more auxiliary frequency-offset estimation signals and the pilot signals are adjacent in the time domain, where the frequency-offset calculating module is configured to calculate, via the multi-column-pilot-combined phase calculation device, the one or more auxiliary frequency-offset estimation signals and the pilot signals that are adjacent in the time domain to determine a third sub frequency offset.

Alternatively or additionally, the pilot signals occupy the entire frequency domain on at least one time-domain unit. The frequency-offset calculating module is further configured to calculate, via a single-symbol estimation device, the pilot signals that occupy the entire frequency domain on any one time-domain unit to determine a fourth sub frequency offset for demodulating the resource block, where the fourth sub frequency offset is greater than the third sub frequency offset.

Figure 30:
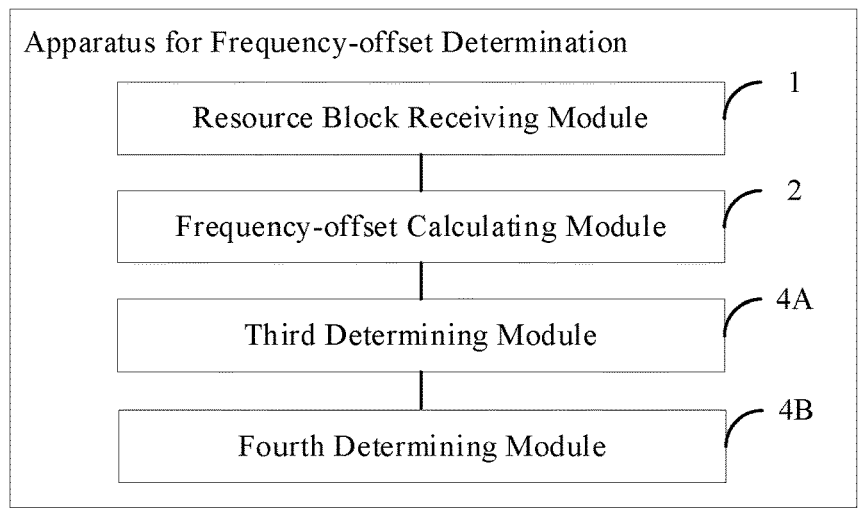
FIG. 30 is a schematic block diagram illustrating another apparatus for frequency-offset determination according to an example of the present disclosure.

FIG. 30 is a schematic block diagram illustrating another apparatus for frequency-offset determination according to an example of the present disclosure. As illustrated in FIG. 30, the apparatus further includes:
- a third determining module 4A that is configured to determine, based on the fourth sub frequency offset, a third frequency for demodulating the resource block; and
- a fourth determining module 4B that is configured to determine, based on the third sub frequency offset, a fourth frequency for demodulating the resource block on a basis of the third frequency.

Alternatively or additionally, the pilot signals do not occupy the entire frequency domain on any one time-domain unit, where the frequency-offset calculating module is further configured to calculate, via the multi-column-pilot-combined phase calculation device, two pilot signals that are on different time-domain units to determine a fifth sub frequency offset for demodulating the resource block, where the third sub frequency offset is greater than the fifth sub frequency offset.

Figure 31:
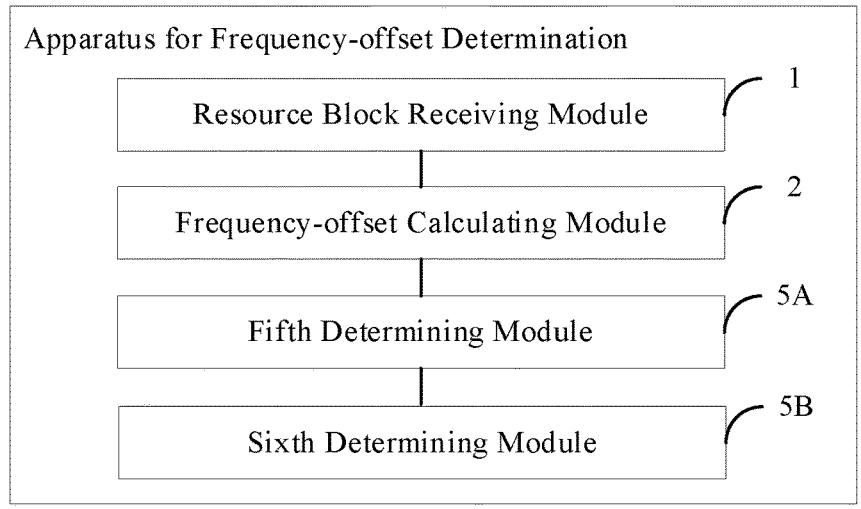
FIG. 31 is a schematic block diagram illustrating another apparatus for frequency-offset determination according to an example of the present disclosure.

FIG. 31 is a schematic block diagram illustrating another apparatus for frequency-offset determination according to an example of the present disclosure. As illustrated in FIG. 31, the apparatus further includes:
- a fifth determining module 5A that is configured to determine, based on the third sub frequency offset, a fifth frequency for demodulating the resource block; and
- a sixth determining module 5B that is configured to determine, based on the fifth sub frequency offset, a sixth frequency for demodulating the resource block on a basis of the fifth frequency.

Figure 32:
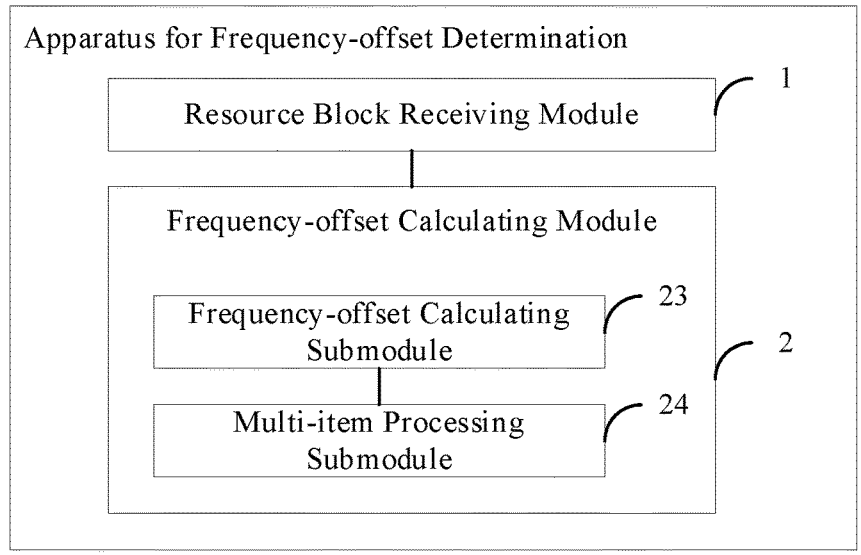
FIG. 32 is a schematic block diagram illustrating another apparatus for frequency-offset determination according to an example of the present disclosure.

FIG. 32 is a schematic block diagram illustrating another apparatus for frequency-offset determination according to an example of the present disclosure. In response to determining that the resource block contains a plurality of pairs of the auxiliary frequency-offset estimation signals and the pilot signals, the frequency-offset calculating module 2 includes:
- a frequency-offset calculating submodule 23 that is configured to calculate the plurality of pairs of the auxiliary frequency-offset estimation signals and the pilot signals to determine a plurality of the frequency offsets; and
- a multi-item processing submodule 24 that is configured to calculate an average value of the plurality of the frequency offsets or a weighted sum of the plurality of the frequency offsets.

Alternatively or additionally, the one or more auxiliary frequency-offset estimation signals and the pilot signals are identical in quantity in the resource block.

Figure 33:
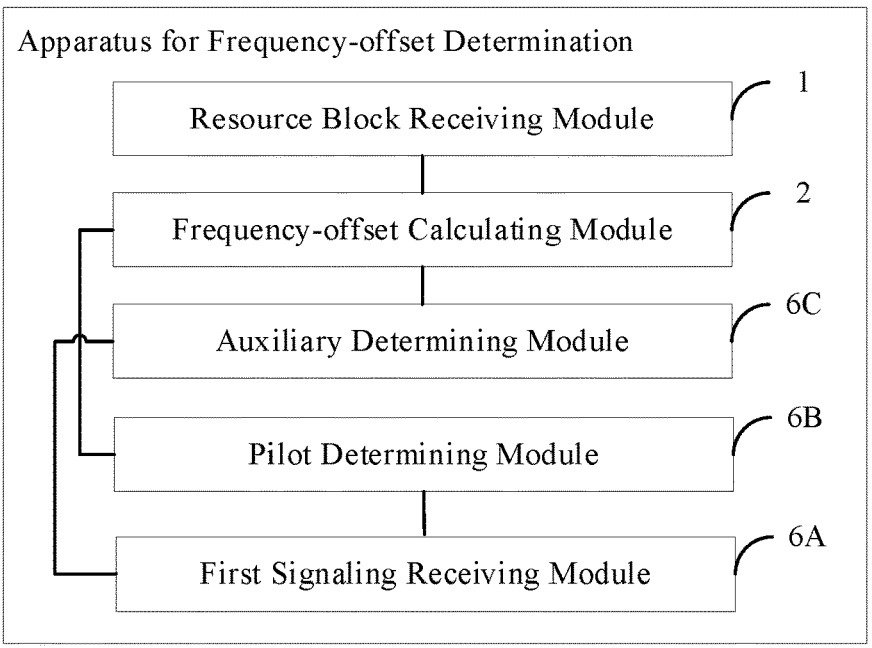
FIG. 33 is a schematic block diagram illustrating another apparatus for frequency-offset determination according to an example of the present disclosure.

FIG. 33 is a schematic block diagram illustrating another apparatus for frequency-offset determination according to an example of the present disclosure. As illustrated in FIG. 33, the apparatus further includes:
- a first signaling receiving module 6A that is configured to receive first indication signaling transmitted by the second device;
- a pilot determining module 6B that is configured to determine time-frequency resource positions of the pilot signals in the resource block according to the first indication signaling; and
- an auxiliary determining module 6C that is configured to determine, based on the time-frequency resource positions of the pilot signals in the resource block and a preset time-domain and/or frequency-domain relationship between the one or more auxiliary frequency-offset estimation signals and the pilot signals in the resource block, time-frequency resource positions of the one or more auxiliary frequency-offset estimation signals in the resource block.

Alternatively or additionally, the pilot signals are larger than the one or more auxiliary frequency-offset estimation signals in quantity in the resource block.

Figure 34:
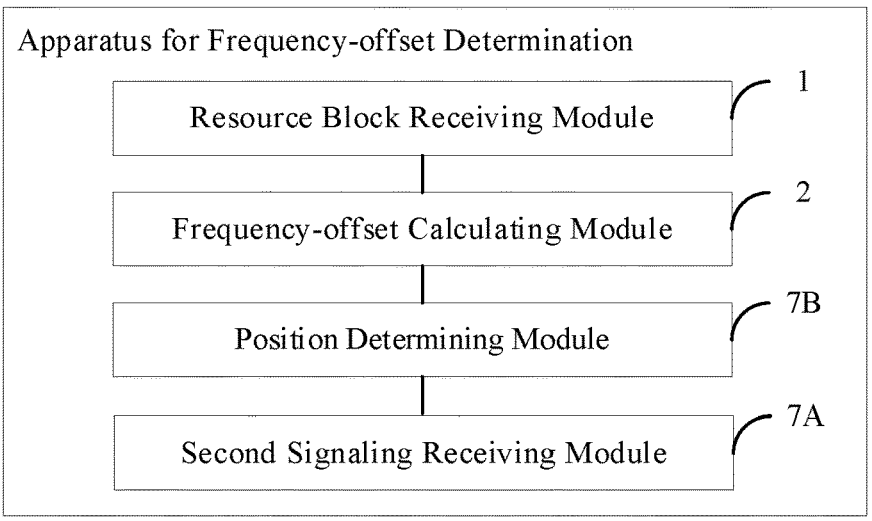
FIG. 34 is a schematic block diagram illustrating another apparatus for frequency-offset determination according to an example of the present disclosure.

FIG. 34 is a schematic block diagram illustrating another apparatus for frequency-offset determination according to an example of the present disclosure. As illustrated in FIG. 34, the apparatus further includes:
- a second signaling receiving module 7A that is configured to receive second indication signaling transmitted by the second device and third indication signaling broadcast by the second device; and
- a position determining module 7B that is configured to determine the time-frequency resource positions of the pilot signals in the resource block according to the second indication signaling and the time-frequency resource positions of the one or more auxiliary frequency-offset estimation signals in the resource block according to the third indication signaling.

Alternatively or additionally, the resource block includes a control channel and a shared channel.

Figure 35:
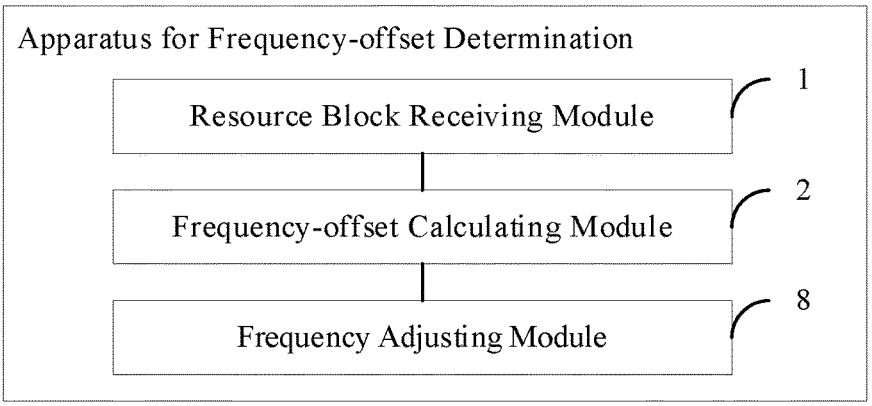
FIG. 35 is a schematic block diagram illustrating another apparatus for frequency-offset determination according to an example of the present disclosure.

FIG. 35 is a schematic block diagram illustrating another apparatus for frequency-offset determination according to an example of the present disclosure. As illustrated in FIG. 35, the apparatus further includes:
- a frequency adjusting module 8 that is configured to adjust, based on the frequency offset, at least one of a frequency for demodulating the control channel or a frequency for demodulating the shared channel.

Alternatively or additionally, the frequency adjusting module is configured to:
- in response to determining that the one or more auxiliary frequency-offset estimation signals and the pilot signals are located within the control channel, adjust, based on the frequency offset, the frequency for demodulating the control channel;
- in response to determining that the one or more auxiliary frequency-offset estimation signals and the pilot signals are located within the shared channel, adjust, based on the frequency offset, the frequency for demodulating the shared channel; and
- in response to determining that for the one or more auxiliary frequency-offset estimation signals and the pilot signals, at least one of them is located within the control channel and at least one of them is located within the shared channel, adjust, based on the frequency offset, the frequency for demodulating the control channel and the frequency for demodulating the shared channel.

FIG. 36 is a schematic block diagram illustrating an apparatus for resource block transmission according to an example of the present disclosure. The apparatus for resource block transmission described in the example of the present disclosure is applicable to a second device in an NR V2X network. The second device can communicate with a first device described in any one of the above examples on the basis of the NR V2X network.

As illustrated in FIG. 36, the apparatus for resource block transmission may include:

a resource block configured module 1' that is configured to configure, based on a frequency offset by which a first device demodulates a resource block transmitted by the second device, the resource block containing one or more auxiliary frequency-offset estimation signals and pilot signals; and a resource block transmitting module 2' that is configured to transmit the resource block to the first device.

Alternatively or additionally, the one or more auxiliary frequency-offset estimation signals and the pilot signals occupy an entire frequency domain on at least one time-domain unit.

Alternatively or additionally, the one or more auxiliary frequency-offset estimation signals include one or more first auxiliary frequency-offset estimation signals and one or more second auxiliary frequency-offset estimation signals. The one or more first auxiliary frequency-offset estimation signals and the pilot signals are adjacent in a time domain, and the one or more second auxiliary frequency-offset estimation signals and the pilot signals occupy the entire frequency domain on at least one time-domain unit.

Alternatively or additionally, the one or more auxiliary frequency-offset estimation signals and the pilot signals are adjacent in the time domain.

Alternatively or additionally, the pilot signals occupy the entire frequency domain on at least one time-domain unit.

Alternatively or additionally, the pilot signals do not occupy the entire frequency domain on any one time-domain unit.

Alternatively or additionally, the resource block includes a plurality of pairs of the auxiliary frequency-offset estimation signals and the pilot signals.

Alternatively or additionally, the one or more auxiliary frequency-offset estimation signals and the pilot signals are identical in quantity in the resource block.

FIG. 37 is a schematic block diagram illustrating another apparatus for resource block transmission according to an example of the present disclosure. As illustrated in FIG. 37, the apparatus further includes:

a first signaling transmitting module 3' that is configured to transmit first indication signaling to the first device. The first indication signaling indicates time-frequency resource positions of the pilot signals in the resource block.

Alternatively or additionally, the pilot signals are larger than the one or more auxiliary frequency-offset estimation signals in quantity in the resource block.

FIG. 38 is a schematic block diagram illustrating another apparatus for resource block transmission according to an example of the present disclosure. As illustrated in FIG. 38, the apparatus further includes:

a second signaling transmitting module 4' that is configured to transmit second indication signaling to the first device and broadcast third indication signaling. The second indication signaling indicates time-frequency resource positions of the pilot signals in the resource block, and the third indication signaling indicates time-frequency resource positions of the one or more auxiliary frequency-offset estimation signals in the resource block.

Alternatively or additionally, the resource block includes a control channel and a shared channel.

Alternatively or additionally, the one or more auxiliary frequency-offset estimation signals and the pilot signals are located within the control channel; or the one or more auxiliary frequency-offset estimation signals and the pilot signals are located within the shared channel; or for the one or more auxiliary frequency-offset estimation signals and the pilot signals, at least one of them is located within the control channel and at least one of them is located within the shared channel.

Regarding the apparatus in the foregoing examples, the specific manner in which each module performs its operation has been described in detail in the examples of the related method, and will not be repeated here.

Since the apparatus examples essentially correspond to the method examples, reference may be made to the description of related parts of the method examples. The apparatus embodiments described above are merely illustrative, wherein the modules described as separate components may or may not be physically separated, and the components displayed as modules may or may not be physical units, that is, may be located in one place or distributed to multiple units in a network. Some or all of the modules may be selected according to actual needs to achieve the objectives of the implementations of the examples. It can be understood and implemented by those of ordinary skill in the art without any creative effort.

An example of the present disclosure also provides an electronic device, including:

one or more processors; and a memory for storing instructions executable by the one or more processors.

The one or more processors are configured to implement the method of frequency-offset determination described in any one of the foregoing examples.

An example of the present disclosure also provides an electronic device, including:

one or more processors; and a memory for storing instructions executable by the one or more processors.

The one or more processors are configured to implement the method of resource block transmission described in any one of the foregoing examples.

An example of the present disclosure also provides a computer-readable storage medium having a computer program stored thereon. The program, when being executed by one or more processors, implements the steps of the method of frequency-offset determination described in any one of the foregoing examples.

An example of the present disclosure also provides a computer-readable storage medium having a computer program stored thereon. The program, when being executed by one or more processors, implements the steps of the method of resource block transmission described in any one of the foregoing examples.

Figure 39:
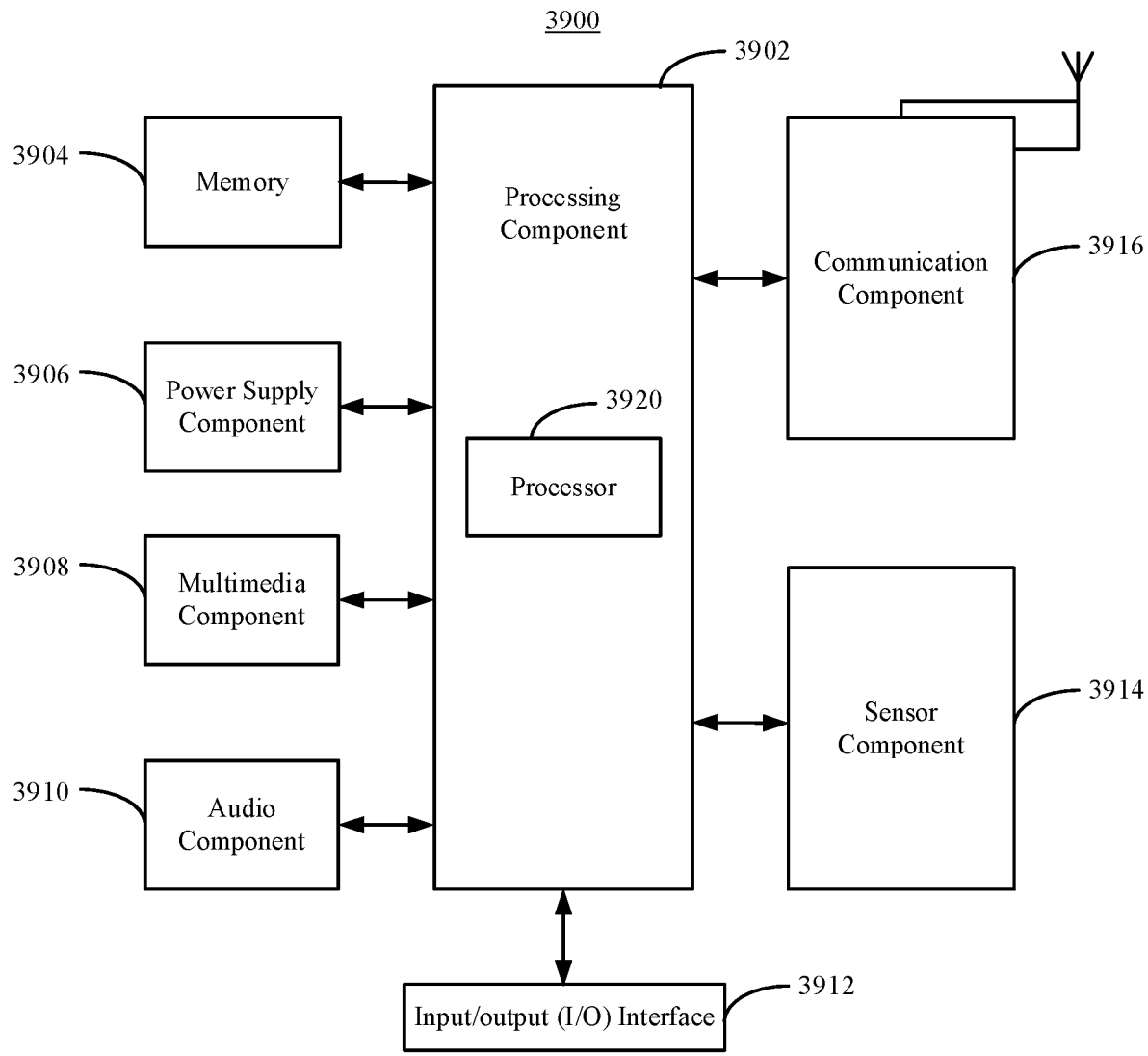
FIG. 39 is a schematic block diagram illustrating an apparatus for frequency-offset determination and/or resource block transmission according to an example of the present disclosure.

FIG. 39 is a schematic block diagram illustrating an apparatus 3900 for frequency-offset determination and/or resource block transmission according to examples of the present disclosure. For example, the apparatus 3900 may be a mobile phone, a computer, a digital broadcasting terminal, a messaging device, a game console, a tablet device, a medical device, a fitness device, a personal digital assistant, and the like.

As illustrated in FIG. 39, the apparatus 3900 may include one or more of the following components: a processing component 3902, a memory 3904, a power supply component 3906, a multimedia component 3908, an audio component 3910, an input/output (I/O) interface 3912, a sensor component 3914, and a communication component 3916.

The processing component 3902 generally controls overall operations of the apparatus 3900, such as operations associated with display, phone calls, data communications, camera operations, and recording operations. The processing element 3902 may include one or more processors 3920 to execute instructions to complete all or part of the steps of the above methods. In addition, the processing component 3902 may include one or more modules which facilitate the interaction between the processing component 3902 and other components. For example, the processing component 3902 may include a multimedia module to facilitate the interaction between the multimedia component 3908 and the processing component 3902.

The memory 3904 is configured to store various types of data to support the operation of the apparatus 3900. Examples of such data include instructions for any application or method operating on the apparatus 3900, contact data, phone book data, messages, pictures, videos, and the like. The memory 3904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3906 supplies power for different components of the apparatus 3900. The power supply component 3906 may include a power supply management system, one or more power supplies, and other components associated with generating, managing and distributing power for the apparatus 3900.

The multimedia component 3908 includes a screen providing an output interface between the apparatus 3900 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 3908 may include a front camera and/or a rear camera. The front camera and/or rear camera may receive external multimedia data when the apparatus 3900 is in an operating mode, such as a photographing mode or a video mode. Each front camera and rear camera may be a fixed optical lens system or have focal length and optical zooming capability.

The audio component 3910 is configured to output and/or input an audio signal. For example, the audio component 3910 includes a microphone (MIC). When the apparatus 3900 is in an operating mode, such as a call mode, a record mode and a voice recognition mode, the microphone is configured to receive an external audio signal. The received audio signal may be further stored in the memory 3904 or sent via the communication component 3916. In some examples, the audio component 3910 further includes a speaker for outputting an audio signal.

The I/O interface 3912 provides an interface between the processing component 3902 and a peripheral interface module. The above peripheral interface module may be a keyboard, a click wheel, buttons, or the like. These buttons may include but not limited to, a home button, a volume button, a start button and a lock button.

The sensor component 3914 includes one or more sensors to provide status assessments of various aspects for the apparatus 3900. For example, the sensor component 3914 may detect an open/closed state of the apparatus 3900 and a relative positioning of components such as the display and keypad of the apparatus 3900, and the sensor component 3914 can also detect a change in position of the apparatus 3900 or a component of the apparatus 3900, the presence or absence of user contact with the apparatus 3900, orientation or acceleration/deceleration of the apparatus 3900, and temperature change of the apparatus 3900. The sensor component 3914 may include a proximity sensor configured to detect the presence of nearby objects without any physical contact. The sensor component 3914 may also include a light sensor, such as a Complementary Metal-Oxide-Semiconductor (CMOS) or Charged Coupled Device (CCD) image sensor, for use in imaging applications. In some examples, the sensor component 3914 may further include an acceleration sensor, a gyroscope sensor, a magnetic sensor, a pressure sensor, or a temperature sensor.

The communication component 3916 is configured to facilitate wired or wireless communication between the apparatus 3900 and other devices. The device 3900 may access a wireless network based on a communication standard, such as Wi-Fi, 2G or 3G, 4G LTE, 5G NR, or a combination thereof. In an example, the communication component 3916 receives broadcast signals or broadcast related information from an external broadcast management system via a broadcast channel. In an example, the communication component 3916 also includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 3900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method of frequency-offset determination and/or resource block transmission described in any of the above examples.

In an example, there is also provided a non-transitory computer-readable storage medium including instructions, such as the memory 3904 including instructions executable by the one or more processors 3920 of the apparatus 3900 to implement the above methods. For example, the non-transitory computer-readable storage medium may be a ROM, a random-access memory (RAM), a CD-ROM, a magnetic tape, a floppy disk, and an optical data storage device.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The method and device provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

What is claimed is:

1. A method of frequency-offset determination, performed by a first device in a new radio (NR) vehicle-to-everything (V2X) network communicating on a high-frequency carrier, the method comprising:
   receiving a resource block containing one or more auxiliary frequency-offset estimation signals and pilot signals from a second device; and
   calculating the one or more auxiliary frequency-offset estimation signals and the pilot signals to determine a frequency offset for demodulating the resource block, wherein at least one of the first device or the second device is a vehicle.

2. The method of claim 1, wherein the one or more auxiliary frequency-offset estimation signals and the pilot signals occupy an entire frequency domain on at least one time-domain unit;
   wherein said calculating the one or more auxiliary frequency-offset estimation signals and the pilot signals to determine the frequency offset for demodulating the resource block comprises:
      calculating, via a single-symbol estimation scheme, the one or more auxiliary frequency-offset estimation signals and the pilot signals that occupy the entire frequency domain on the at least one time-domain unit to determine the frequency offset.

3. The method of claim 1, wherein the one or more auxiliary frequency-offset estimation signals comprise one or more first auxiliary frequency-offset estimation signals and one or more second auxiliary frequency-offset estimation signals,
   wherein the one or more first auxiliary frequency-offset estimation signals and the pilot signals are adjacent in a time domain,
   wherein the one or more second auxiliary frequency-offset estimation signals and the pilot signals occupy an entire frequency domain on at least one time-domain unit,
   wherein said calculating the one or more auxiliary frequency-offset estimation signals and the pilot signals to determine the frequency offset for demodulating the resource block comprises:
      calculating, via a single-symbol estimation scheme, the one or more second auxiliary frequency-offset estimation signals and the pilot signals that occupy the entire frequency domain on the at least one time-domain unit to determine a first sub frequency offset; and
      calculating, via a multi-column-pilot-combined phase calculation scheme, the one or more first auxiliary frequency-offset estimation signals and the pilot signals that are adjacent in the time domain to determine a second sub frequency offset, wherein the first sub frequency offset is greater than the second sub frequency offset; and
   wherein the method further comprises:
      determining, based on the first sub frequency offset, a first frequency for demodulating the resource block; and
      determining, based on the second sub frequency offset, a second frequency for demodulating the resource block on a basis of the first frequency.

4. The method of claim 1, wherein the one or more auxiliary frequency-offset estimation signals and the pilot signals are adjacent in a time domain;
   wherein said calculating the one or more auxiliary frequency-offset estimation signals and the pilot signals to determine the frequency offset for demodulating the resource block comprises:
      calculating, via a multi-column-pilot-combined phase calculation scheme, the one or more auxiliary frequency-offset estimation signals and the pilot signals that are adjacent in the time domain to determine a third sub frequency offset.

5. The method of claim 4, wherein the pilot signals occupy an entire frequency domain on at least one time-domain unit;
   wherein said calculating the one or more auxiliary frequency-offset estimation signals and the pilot signals to determine the frequency offset for demodulating the resource block further comprises:
      calculating, via a single-symbol estimation scheme, the pilot signals that occupy the entire frequency domain on any one time-domain unit to determine a fourth sub frequency offset for demodulating the resource block, wherein the fourth sub frequency offset is greater than the third sub frequency offset; and
   wherein the method further comprises:
      determining, based on the fourth sub frequency offset, a third frequency for demodulating the resource block; and
      determining, based on the third sub frequency offset, a fourth frequency for demodulating the resource block on a basis of the third frequency.

6. The method of claim 4, wherein the pilot signals do not occupy an entire frequency domain on any one time-domain unit;
   wherein said calculating the one or more auxiliary frequency-offset estimation signals and the pilot signals to determine the frequency offset for demodulating the resource block further comprises:
      calculating, via a multi-column-pilot-combined phase calculation scheme, two pilot signals that are on different time-domain units to determine a fifth sub frequency offset for demodulating the resource block, wherein the third sub frequency offset is greater than the fifth sub frequency offset; and wherein the method further comprises:

determining, based on the third sub frequency offset, a fifth frequency for demodulating the resource block; and determining, based on the fifth sub frequency offset, a sixth frequency for demodulating the resource block on a basis of the fifth frequency.

7. The method of claim 1, wherein in response to determining that the resource block contains a plurality of pairs of the auxiliary frequency-offset estimation signals and the pilot signals, said calculating the one or more auxiliary frequency-offset estimation signals and the pilot signals to determine the frequency offset for demodulating the resource block comprises:

calculating the plurality of pairs of the auxiliary frequency-offset estimation signals and the pilot signals to determine a plurality of pre-processing frequency offsets; and calculating an average value of the plurality of the pre-processing frequency offsets or a weighted sum of the plurality of the pre-processing frequency offsets.

8. The method of claim 1, wherein the one or more auxiliary frequency-offset estimation signals and the pilot signals are identical in quantity in the resource block, and wherein the method further comprises:

receiving first indication signaling from the second device;

determining time-frequency resource positions of the pilot signals in the resource block according to the first indication signaling; and determining, based on the time-frequency resource positions of the pilot signals in the resource block and a preset time-domain and/or frequency-domain relationship between the one or more auxiliary frequency-offset estimation signals and the pilot signals in the resource block, time-frequency resource positions of the one or more auxiliary frequency-offset estimation signals in the resource block.

9. The method of claim 1, wherein the pilot signals are larger than the one or more auxiliary frequency-offset estimation signals in quantity in the resource block, and wherein the method further comprises:

receiving second indication signaling transmitted by the second device and third indication signaling broadcast by the second device; and determining time-frequency resource positions of the pilot signals in the resource block according to the second indication signaling and time-frequency resource positions of the one or more auxiliary frequency-offset estimation signals in the resource block according to the third indication signaling.

10. The method of claim 1, wherein the resource block comprises a control channel and a shared channel, and wherein the method further comprises:

adjusting, based on the frequency offset, at least one of a frequency for demodulating the control channel or a frequency for demodulating the shared channel, which comprises:

in response to determining that the one or more auxiliary frequency-offset estimation signals and the pilot signals are located within the control channel, adjusting, based on the frequency offset, the frequency for demodulating the control channel;

in response to determining that the one or more auxiliary frequency-offset estimation signals and the pilot signals are located within the shared channel, adjusting, based on the frequency offset, the frequency for demodulating the shared channel; and in response to determining that for the one or more auxiliary frequency-offset estimation signals and the pilot signals, at least one of which is located within the control channel and at least one of which is located within the shared channel, adjusting, based on the frequency offset, the frequency for demodulating the control channel and the frequency for demodulating the shared channel.

11. A method of resource block transmission, performed by a second device in a new radio (NR) vehicle-to-everything (V2X) network communicating on high-frequency carrier, the method comprising:

configuring, based on a frequency offset by which a first device demodulates a resource block transmitted by the second device, the resource block containing one or more auxiliary frequency-offset estimation signals and pilot signals; and transmitting the resource block to the first device.

12. The method of claim 11, wherein the one or more auxiliary frequency-offset estimation signals and the pilot signals occupy an entire frequency domain on at least one time-domain unit.

13. The method of claim 11, wherein the one or more auxiliary frequency-offset estimation signals comprise one or more first auxiliary frequency-offset estimation signals and one or more second auxiliary frequency-offset estimation signals, wherein the one or more first auxiliary frequency-offset estimation signals and the pilot signals are adjacent in a time domain, and the one or more second auxiliary frequency-offset estimation signals and the pilot signals occupy an entire frequency domain on at least one time-domain unit.

14. The method of claim 11, wherein the one or more auxiliary frequency-offset estimation signals and the pilot signals are adjacent in a time domain, wherein the pilot signals occupy an entire frequency domain on at least one time-domain unit; or the pilot signals do not occupy an entire frequency domain on any one time-domain unit.

15. The method of claim 11, wherein the resource block contains a plurality of pairs of the auxiliary frequency-offset estimation signals and the pilot signals.

16. The method of claim 11, wherein the one or more auxiliary frequency-offset estimation signals and the pilot signals are identical in quantity in the resource block, wherein the method further comprises:

transmitting first indication signaling to the first device, wherein the first indication signaling indicates time-frequency resource positions of the pilot signals in the resource block.

17. The method of claim 11, wherein the pilot signals are larger than the one or more auxiliary frequency-offset estimation signals in quantity in the resource block, wherein the method further comprises:

transmitting second indication signaling to the first device and broadcasting third indication signaling, wherein the second indication signaling indicates time-frequency resource positions of the pilot signals in the resource block, and the third indication signaling indicates time-frequency resource positions of the one or more auxiliary frequency-offset estimation signals in the resource block.

18. The method of claim 11, wherein the resource block comprises a control channel and a shared channel, wherein the one or more auxiliary frequency-offset estimation signals and the pilot signals are located within the control channel; or the one or more auxiliary frequency-offset estimation signals and the pilot signals are located within the shared channel; or for the one or more auxiliary frequency-offset estimation signals and the pilot signals, at least one of which is located within the control channel and at least one of which is located within the shared channel.

19. A communication system comprising a first device, comprising:

one or more processors; and a memory for storing instructions executable by the one or more processors;

wherein the one or more processors are configured to:

receive a resource block containing one or more auxiliary frequency-offset estimation signals and pilot signals from a second device; and calculate the one or more auxiliary frequency-offset estimation signals and the pilot signals to determine a frequency offset for demodulating the resource block, wherein at least one of the first device or the second device is a vehicle;

wherein the communication system is configured to add the one or more auxiliary frequency-offset estimation signals into the resource block, without changing an original distribution of pilot signals in the resource block, thereby facilitating calculation of a greater frequency offset for a new radio (NR) vehicle-to-everything (V2X) communication on a high-frequency carrier.

20. The communication system of claim 19, further comprising the second device configured to:

configure, based on a frequency offset by which the first device demodulates a resource block transmitted by the second device, the resource block containing one or more auxiliary frequency-offset estimation signals and pilot signals; and transmit the resource block to the first device.

* * * * *